United States Patent
Amagai et al.

(10) Patent No.: US 10,230,076 B2
(45) Date of Patent: Mar. 12, 2019

(54) STATIONARY ELECTRIC POWER SYSTEM AND METHOD FOR MANUFACTURING STATIONARY ELECTRIC POWER SYSTEM INCLUDING BATTERY BODY AND SPACER

(75) Inventors: Ryuichi Amagai, Isehara (JP); Naoto Todoroki, Sagamihara (JP); Michinori Ikezoe, Ebina (JP); Toshiyuki Motohashi, Funabashi (JP); Tomio Nagashima, Ayase (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 462 days.

(21) Appl. No.: 13/988,044

(22) PCT Filed: Oct. 14, 2011

(86) PCT No.: PCT/JP2011/073618
§ 371 (c)(1),
(2), (4) Date: May 17, 2013

(87) PCT Pub. No.: WO2012/066882
PCT Pub. Date: May 24, 2012

(65) Prior Publication Data
US 2013/0229147 A1    Sep. 5, 2013

(30) Foreign Application Priority Data

Nov. 18, 2010 (JP) ................. 2010-258294
Sep. 26, 2011 (JP) ................. 2011-208523

(51) Int. Cl.
H01M 2/10      (2006.01)
H01M 2/14      (2006.01)
(Continued)

(52) U.S. Cl.
CPC .......... *H01M 2/10* (2013.01); *H01M 2/0245* (2013.01); *H01M 2/0287* (2013.01);
(Continued)

(58) Field of Classification Search
CPC .......... H01M 2/1077; H01M 10/0413; H01M 2/0245; H01M 2/0287; H01M 2/14; H01M 2/18; H01M 6/46; H01M 2/10
(Continued)

(56) References Cited

U.S. PATENT DOCUMENTS 6,724,170 B1    4/2004  Maggert et al.
7,244,527 B2    7/2007  Klein
(Continued)

FOREIGN PATENT DOCUMENTS

CN    101202333 A    6/2008
CN    101386270 A    3/2009
(Continued)

*Primary Examiner* — Richard Isla
*Assistant Examiner* — Manuel Hernandez
(74) *Attorney, Agent, or Firm* — Foley & Lardner LLP

(57) ABSTRACT

A stationary electric power system including a low profile secondary battery that includes a battery body including an electric power generating element accommodated in an exterior package member. The low profile secondary battery includes a spacer disposed between the battery body and other battery body when the other battery body is stacked on the battery body. The spacer fixes the battery body in a predetermined position. The battery body and the spacer are connected with each other through an elastic body.

25 Claims, 19 Drawing Sheets

(51) Int. Cl.
  *H01M 10/04* (2006.01)
  *H01M 10/42* (2006.01)
  *H01M 2/02* (2006.01)
  *H01M 2/12* (2006.01)
  *H01M 2/18* (2006.01)
  *H01M 10/46* (2006.01)
  *H01M 6/46* (2006.01)

(52) U.S. Cl.
  CPC ....... *H01M 2/1077* (2013.01); *H01M 2/1241* (2013.01); *H01M 2/14* (2013.01); *H01M 2/18* (2013.01); *H01M 10/0413* (2013.01); *H01M 10/425* (2013.01); *H01M 10/465* (2013.01); *H01M 6/46* (2013.01); *H01M 2220/10* (2013.01); *Y10T 29/49002* (2015.01)

(58) Field of Classification Search
  USPC .......................................................... 429/163
  See application file for complete search history.

(56) References Cited

U.S. PATENT DOCUMENTS

| | | | |
|---|---|---|---|
| 7,829,216 B2 | 11/2010 | Han et al. | |
| 2005/0140338 A1* | 6/2005 | Kim | H01M 2/202 320/150 |
| 2006/0088761 A1 | 4/2006 | Ota et al. | |
| 2007/0141457 A1 | 6/2007 | Amagai | |
| 2007/0154799 A1 | 7/2007 | Yoon et al. | |
| 2007/0207377 A1 | 9/2007 | Han et al. | |
| 2008/0138698 A1 | 6/2008 | Ogami et al. | |
| 2010/0248029 A1* | 9/2010 | Butt | H01M 2/1077 429/211 |
| 2010/0255351 A1* | 10/2010 | Ijaz | H01M 2/1077 429/7 |
| 2010/0266883 A1* | 10/2010 | Koetting | H01M 2/1077 429/96 |
| 2010/0273042 A1* | 10/2010 | Buck | H01M 2/024 429/120 |
| 2010/0304203 A1* | 12/2010 | Buck | H01M 2/1072 429/120 |
| 2012/0231318 A1* | 9/2012 | Buck | H01M 2/0245 429/120 |
| 2013/0065109 A1* | 3/2013 | Amagai | H01M 2/021 429/162 |
| 2013/0171486 A1* | 7/2013 | Joye | H01M 2/1072 429/98 |

FOREIGN PATENT DOCUMENTS

| | | |
|---|---|---|
| EP | 1 577 966 A2 | 9/2005 |
| JP | 10-55792 A | 2/1998 |
| JP | 2006-210312 A | 8/2006 |
| JP | 2007-73510 A | 3/2007 |
| JP | 2007-87922 A | 4/2007 |
| JP | 2007-172893 A | 7/2007 |
| JP | 2008-147045 A | 6/2008 |
| JP | 2008-269926 A | 11/2008 |
| RU | 74 742 U1 | 7/2008 |
| RU | 2 364 012 C2 | 8/2009 |

* cited by examiner

_US 10,230,076 B2_

STATIONARY ELECTRIC POWER SYSTEM AND METHOD FOR MANUFACTURING STATIONARY ELECTRIC POWER SYSTEM INCLUDING BATTERY BODY AND SPACER

TECHNICAL FIELD

The present invention relates to a stationary electric power system including a low profile (or thin-type) secondary battery and a method for manufacturing a stationary electric power system.

BACKGROUND ART

There has been proposed a low profile secondary battery having a laminated film exterior package member, in which a plastic frame member is mounted to a periphery of the exterior package member, thereby improving mechanical rigidity of the exterior package member and sealability of the periphery of the exterior package member (Patent Literature 1).

CITATION LIST

Patent Literature

Patent Literature 1: Japanese Patent Application Unexamined Publication No. 2007-73510

SUMMARY OF INVENTION

Technical Problem

However, the secondary battery of the above-described conventional technology has a structure in which an outer peripheral sealing portion of the exterior package member is inserted into a coupling groove of the frame member and coupled therewith (see "elastically coupled" in paragraph 0041 of Patent Literature 1). Due to this structure, there is a problem that a fixed state of the secondary battery cannot be kept stable relative to vibration of earthquake, vibration in a large traffic volume place, etc.

An object of the present invention is to provide a low profile secondary battery having an excellent stability when kept in a fixed state relative to vibration of earthquake, vibration in a large traffic volume place, etc.

Solution to Problem

The present invention can solve the above-described problem by a stationary electric power system having a low profile secondary battery, the low profile secondary battery including a battery body including an electric power generating element sealed in an exterior package member, and a spacer disposed between the battery body and other battery body when the other battery body is stacked on the battery body, the spacer fixing the battery body in a predetermined position, the battery bodies and the spacer being connected with each other through an elastic body.

Effect of Invention

According to the present invention, when an external force such as vibration of earthquake, vibration in a large traffic volume place, etc. is inputted to the battery body through the spacer, a damping force relative to the external force is generated in the elastic member, thereby stably keeping the low profile secondary battery in a fixed state.

DESCRIPTION OF EMBODIMENTS

First Embodiment

Figure 1:
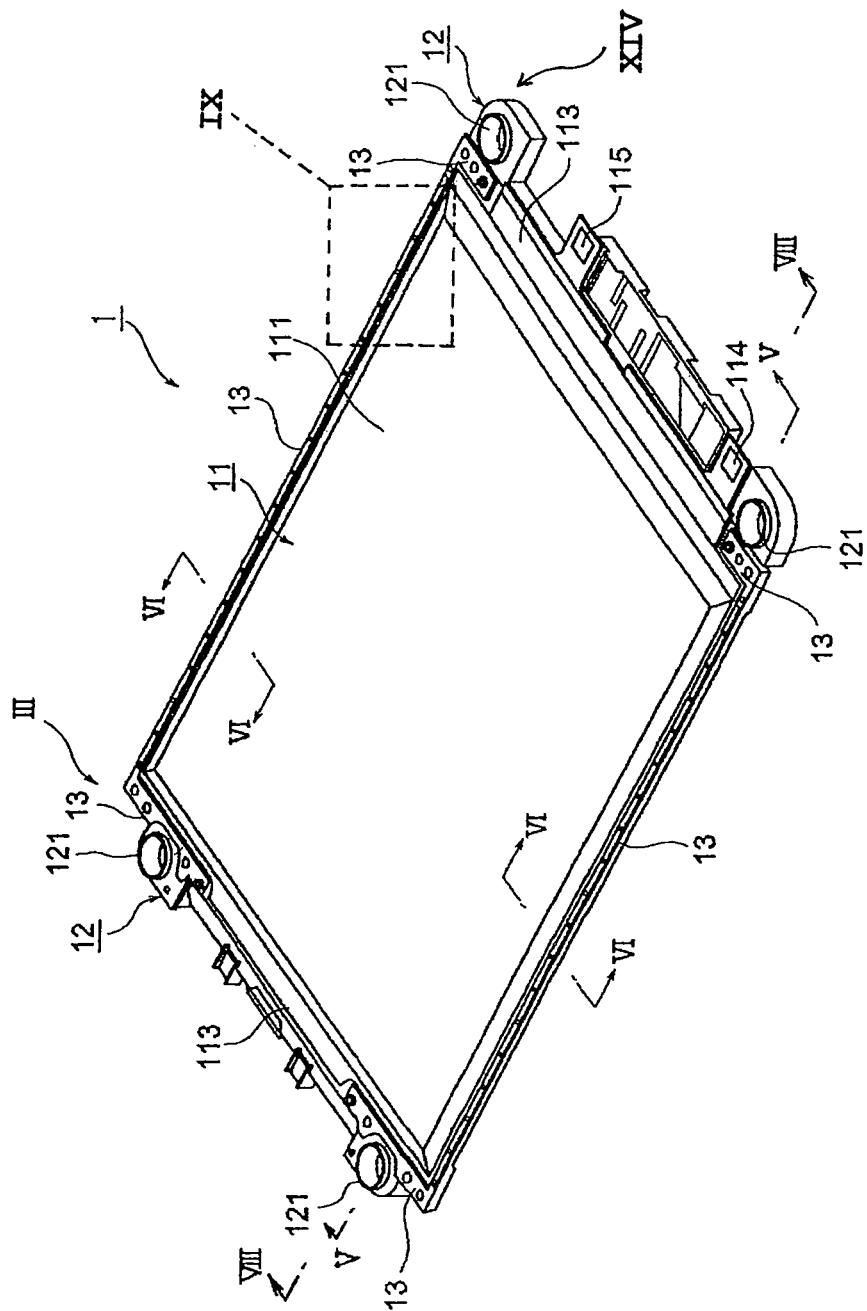
FIG. 1 is a perspective view showing a secondary battery in a stationary electric power system according to an embodiment of the present invention.
Figure 2:
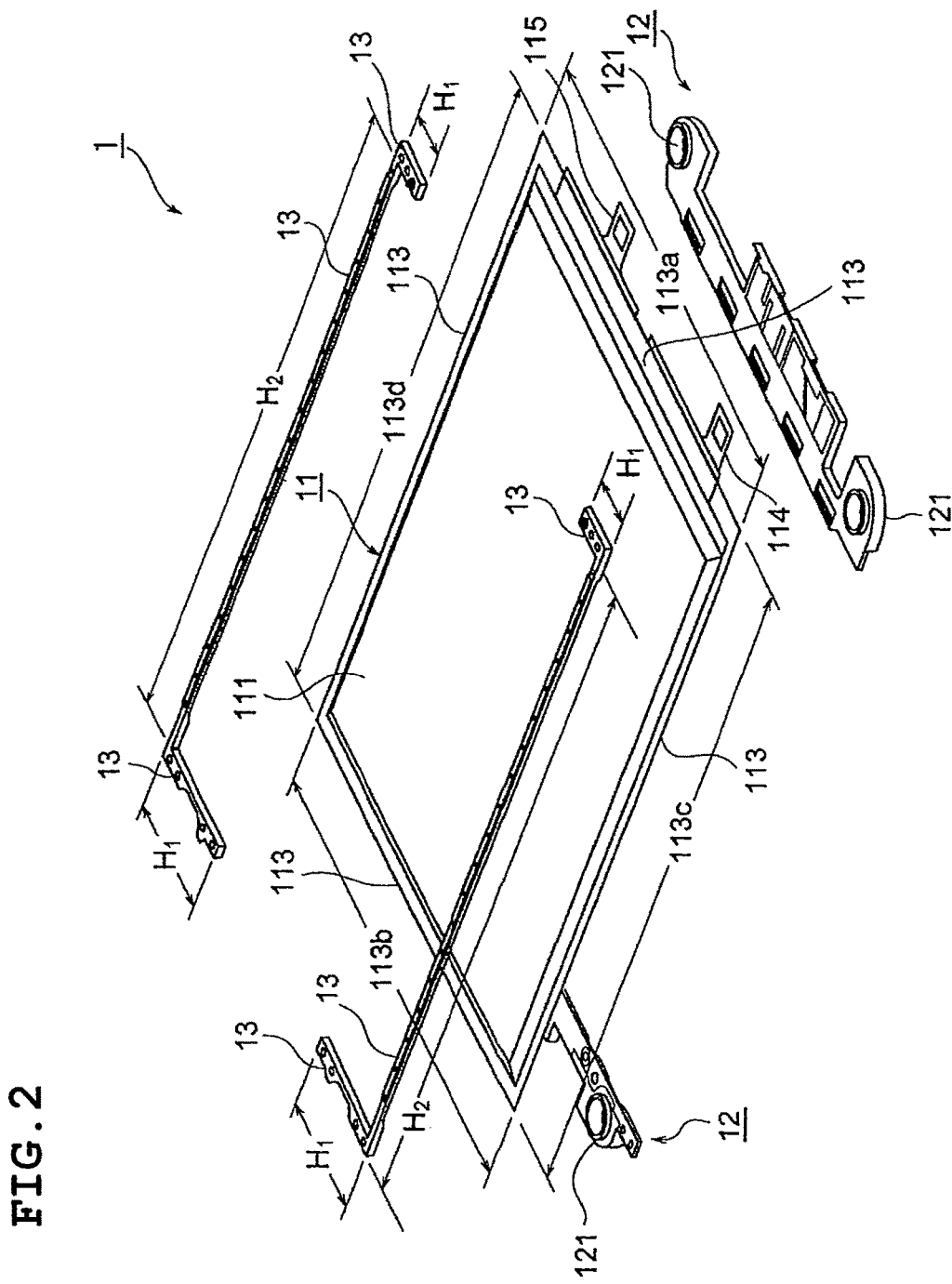
FIG. 2 is an exploded perspective view showing a main structure of the secondary battery as shown in FIG. 1.

FIG. 1 is a perspective view of a secondary battery in a stationary electric power system according to an embodiment of the present invention, showing a completed state of the secondary battery. FIG. 2 is an exploded perspective view of the secondary battery, showing main components of the secondary battery. As shown in FIG. 1 and FIG. 2, secondary battery 1 in a stationary electric power system according to the embodiment includes low profile flat battery body 11, spacer 12 and elastic resin portion 13 formed in a region in which battery body 11 and spacer 12 are included.

Battery body 11 is constructed such that electric power generating element 112 is accommodated in a space defined between a pair of laminated film exterior package members 111, and outer peripheral portions 113 of the pair of exterior package members 111 are sealed together. FIG. 1 to FIG. 4 show one of exterior package members 111 only. FIG. 5 shows electric power generating element 112. The laminated film that forms each of exterior package members 111 has for instance, a three-layered structure shown in section as indicated by leader line A in FIG. 5. The laminated film includes inner resin layer 111a, intermediate metal layer 111b, and outer resin layer 111c in the order from an inside of secondary battery 1 toward an outside thereof. Inner resin layer 111a may be formed of a resin film that has excellent electrolyte resistance and heat fusibility. Examples of the resin film include films of polyethylene, modified polyethylene, polypropylene, modified polypropylene, and ionomer. Intermediate metal layer 111b may be formed of a metal foil such as an aluminum foil. Outer resin layer 111c may be formed of a resin film having an excellent electric insulation property, for instance, a polyamide-based resin film and a polyester-based resin film. Outer resin layer 111c corresponds to a resin layer according to the present invention.

Thus, each of the pair of exterior package members 111 is formed of a resilient material such as a resin-metal film laminated material in which one surface of intermediate metal layer 111b (inner surface of secondary battery 1) made of such a material as an aluminum foil is laminated by polyethylene, modified polyethylene, polypropylene, modified polypropylene, or ionomer, and the other surface of intermediate metal layer 111b (outer surface of secondary battery 1) is laminated by the polyamide-based resin or the polyester-based resin.

With this structure in which each of the pair of exterior package members 111 includes intermediate metal layer 111b in addition to inner and outer resin layers 111a, 111c, strength of exterior package member 111 per se can be enhanced. Further, with the structure in which inner resin layer 111a of exterior package member 111 is made of a resin such as polyethylene, modified polyethylene, polypropylene, modified polypropylene, and ionomer, it is possible to ensure good fusibility to electrode terminals 114, 115 made of metal.

Further, the structure of exterior package member 111 according to the present invention is not limited to the above-described three-layer structure only, but may be a single layer structure constituted of one of inner and outer resin layers 111a, 111c. In addition, the structure of exterior package member 111 according to the present invention may be a double-layer structure constituted of one of inner and outer resin layers 111a, 111c and intermediate metal layer 111b. Further, the structure of exterior package member 111 according to the present invention may be a multi-layer structure constituted of four or more layers, if necessary.

Each of the pair of exterior package members 111 has a shallow bowl shape (dish shape) formed from a rectangular flat plate so as to accommodate electric power generating element 112 therein. After electric power generating element 112 and an electrolyte solution are accommodated in a space between exterior package members 111, outer peripheral portions 113 of exterior package members 111 are overlapped with each other, and then outer peripheral portions 113 joined with each other over entire peripheries thereof by heat seal or through an adhesive agent.

Figure 8:
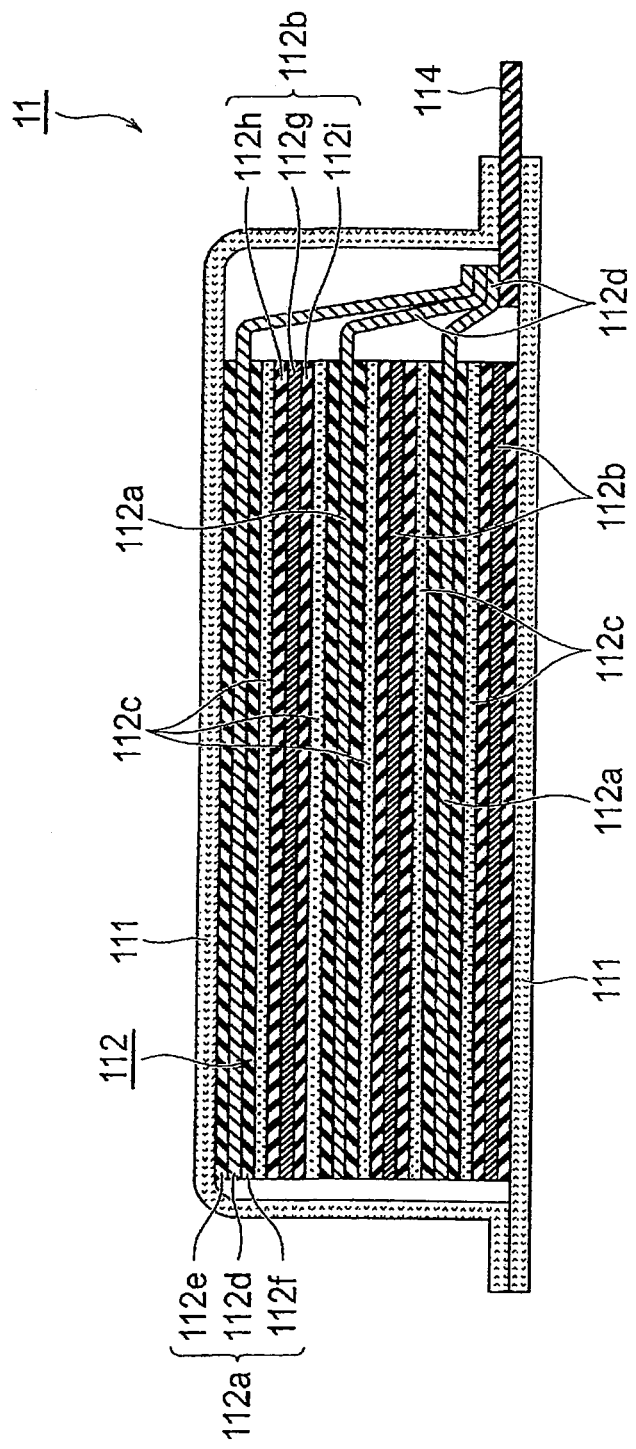
FIG. 8 is a sectional view of a battery body, taken along line VIII-VIII shown in FIG. 1.

Secondary battery 1 of the stationary electric power system according to this embodiment is a lithium ion secondary battery. As shown in FIG. 8, electric power generating element 112 has a laminated structure which includes positive electrode plates 112a, negative electrode plates 112b, and separators 112c each disposed between positive electrode plate 112a and negative electrode plate 112b. Electric power generating element 112 of this embodiment is constituted of three positive electrode plates 112a, five separators 112c, three negative electrode plates 112b, and electrolyte (not shown). Further, secondary battery 1 according to the present invention is not limited to the lithium ion secondary battery, but may be any other type of battery.

Positive electrode plate 112a constituting electric power generating element 112 includes positive electrode side current collector 112d extending up to positive electrode terminal 114, and positive electrode layers 112e, 112f respectively formed on both main surfaces of a part of positive electrode side current collector 112d. Although in this embodiment, positive electrode plate 112a and positive electrode side current collector 112d are formed of one sheet of conductor, positive electrode plate 112a and positive electrode side current collector 112d may be formed of separate members and joined with each other.

Positive electrode side current collector 112d of positive electrode plate 112a is formed of an electrochemically stable metal foil such as, for instance, an aluminum foil, an aluminum alloy foil, a copper foil, and a nickel foil. Further, positive electrode layers 112e, 112f of positive electrode plate 112a are respectively formed by applying a mixture of a lithium composite oxide, or a positive electrode active substance such as chalcogen (S, Se, Te) compounds, a conductive agent such as carbon black, an adhesive agent such as an aqueous dispersion of polytetrafluoroethylene, and a solvent, onto the both main surfaces of positive electrode side current collector 112d and then subjecting the mixture applied onto the both main surfaces to drying and rolling. Examples of the lithium composite oxide include lithium nickelate ($LiNiO_2$), lithium manganate ($LiMnO_2$), and lithium cobaltate ($LiCoO_2$).

Negative electrode plate 112b constituting electric power generating element 112 includes negative electrode side current collector 112g extending up to negative electrode terminal 115, and negative electrode layers 112h, 112i respectively formed on both main surfaces of a part of negative electrode side current collector 112g. Although in this embodiment, negative electrode plate 112b and negative electrode side current collector 112g are formed of one sheet of conductor, negative electrode plate 112b and negative electrode side current collector 112g may be formed of separate members and joined with each other.

Negative electrode side current collector 112g of negative electrode plate 112b is formed of an electrochemically stable metal foil such as, for instance, a nickel foil, a copper foil, a stainless steel foil, and an iron foil. Further, negative electrode layers 112h, 112i of negative electrode plate 112b are respectively formed as follows. That is, a negative electrode active substance capable of absorbing and releasing lithium ions of the above-described positive electrode active substance such as amorphous carbon, non-graphitizable carbon, ready-graphitizable carbon, and graphite is blended with an aqueous dispersion of a styrene-butadiene rubber resin powder as a precursor material of a baked organic substance, and the obtained mixture is subjected to drying and milling to thereby form carbon particles carrying carbonized styrene-butadiene rubber on surfaces thereof. The thus obtained carbon particles as a main material are mixed with a binder such as acrylic resin emulsion, and the resulting mixture is applied onto the both main surfaces of negative electrode side current collector 112g, and then subjecting the mixture applied onto the both main surfaces to drying and rolling to thereby obtain negative electrode layers 112h, 112i.

Separator 112c disposed between positive electrode plate 112a and negative electrode plate 112b serves for preventing a short circuit between positive electrode plate 112a and negative electrode plate 112b, and may have a function of retaining an electrolyte. Separator 112c is a microporous film formed of a polyolefin such as polyethylene and polypropylene, and also has such a function that when an overcurrent flows therethrough, pores in the layer are closed to interrupt the current flow by heat generated by the overcurrent. However, separator 112c is not limited to a single layer film only, but may have a three-layer structure in which a polypropylene film is sandwiched between polyethylene films, or a laminated structure in which a polyolefin microporous film and an organic nonwoven fabric are laminated. Owing to the multi-layer structure of separator 112c, it is possible to give various functions such as a function of suppressing the overcurrent, a function of retaining the electrolyte, and a function of retaining the shape of separator 112c (enhancing the rigidity).

The above-described electric power generating element 112 has a laminated structure in which positive electrode plates 112a and negative electrode plates 112b are alternately stacked on each other through separator 112c therebetween. Three positive electrode plates 112a are connected to positive electrode terminal 114 made of a metal foil through positive electrode side current collector 112d. On the other hand, three negative electrode plates 112b are connected to negative electrode terminal 115 made of a metal foil through negative electrode side current collector 112g.

As shown in FIG. 1, positive electrode terminal 114 and negative electrode terminal 115 are respectively derived from positive electrode plate 112a and negative electrode plate 112b to an outside of exterior package member 111. In secondary battery 1 of this embodiment, positive electrode terminal 114 and negative electrode terminal 115 are derived from outer peripheral portion 113a of one side of exterior package member 111 (a front short side as shown in FIG. 1) in parallel with each other. Positive electrode terminal 114 and negative electrode terminal 115 are also referred to as positive electrode tab 114 and negative electrode tab 115, respectively.

In secondary battery 1 of this embodiment, positive electrode terminal 114 and negative electrode terminal 115 are derived from an outer peripheral portion of one side of exterior package member 111 in parallel with each other. Although FIG. 8 shows a sectional view of electric power generating element 112 taken along a line extending from positive electrode plate 112a to positive electrode terminal 114 but omits a sectional view of electric power generating element 112 taken along a line extending from negative electrode plate 112b to negative electrode terminal 115, both negative electrode plate 112b and negative electrode terminal 115 have a structure similar to that of positive electrode plate 112a and positive electrode terminal 114. However, a portion of positive electrode plate 112a (positive electrode side current collector 112d) which extend from an end (side) of electric power generating element 112 to positive electrode terminal 114, and a portion of negative electrode plate 112b (negative electrode side current collector 112g) which extend from the end (side) of electric power generating element 112 to negative electrode terminal 115 are cut out to reduce a width thereof to not more than a half of a whole width thereof such that positive electrode plate 112a and negative electrode plate 112b are prevented from being contacted with each other in plan view.

Battery body 11 has an elongated rectangular shape in plan view, and therefore, outer peripheral portion 113 at which the pair of exterior package members 111 are joined with each other to seal the inside is referred to as outer peripheral portions 113a-113d as shown in FIG. 2. Further, an outer shape of battery body 11 is not limited to the elongated rectangular shape only, but may be a square shape or any other polygonal shape. Further, a position from which positive electrode terminal 114 and negative electrode terminal 115 are derived is not limited to one outer peripheral portion 113a as in this embodiment. Positive electrode terminal 114 and negative electrode terminal 115 may be respectively derived from opposed outer peripheral portions 113a and 113b or opposed outer peripheral portions 113c and 113d. Furthermore, positive electrode terminal 114 and negative electrode terminal 115 may be derived from long side outer peripheral portions 113c, 113d.

Battery body 11 constructed as described above can be used solely, and also can be connected and combined with one or more other secondary batteries to thereby provide a secondary battery (hereinafter also referred to as a battery module) which has a desired power output and capacity. Further, a plurality of the battery modules can be connected and combined with each other (hereinafter also referred to as a battery pack). This battery pack can be used as a power source of the stationary electric power system. A concrete example of the stationary electric power system will be explained later in details by referring to FIG. 9.

Figure 4:
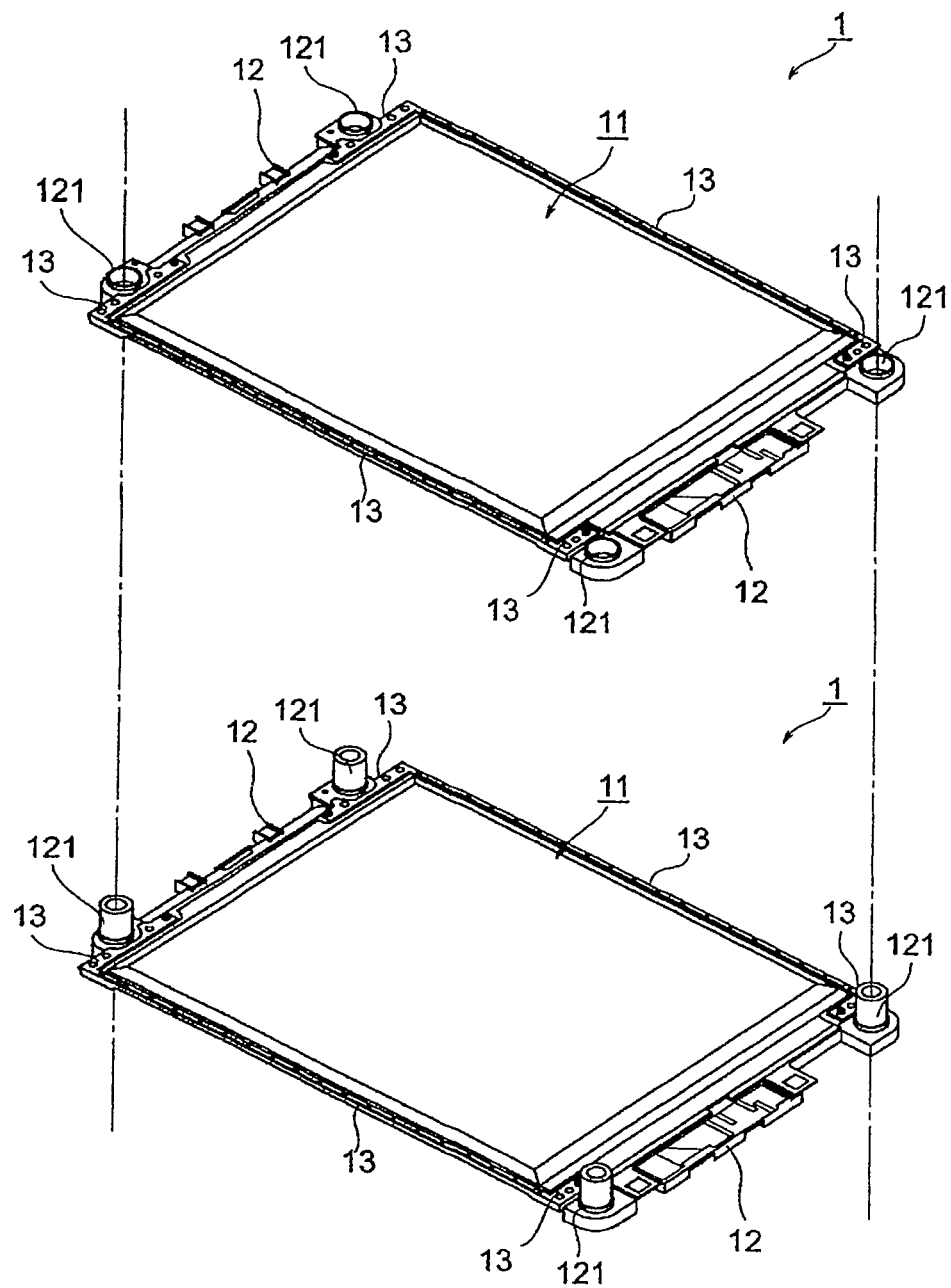
FIG. 4 is a perspective view showing a state of stacking the secondary battery shown in FIG. 1 on other secondary battery.
Figure 5:
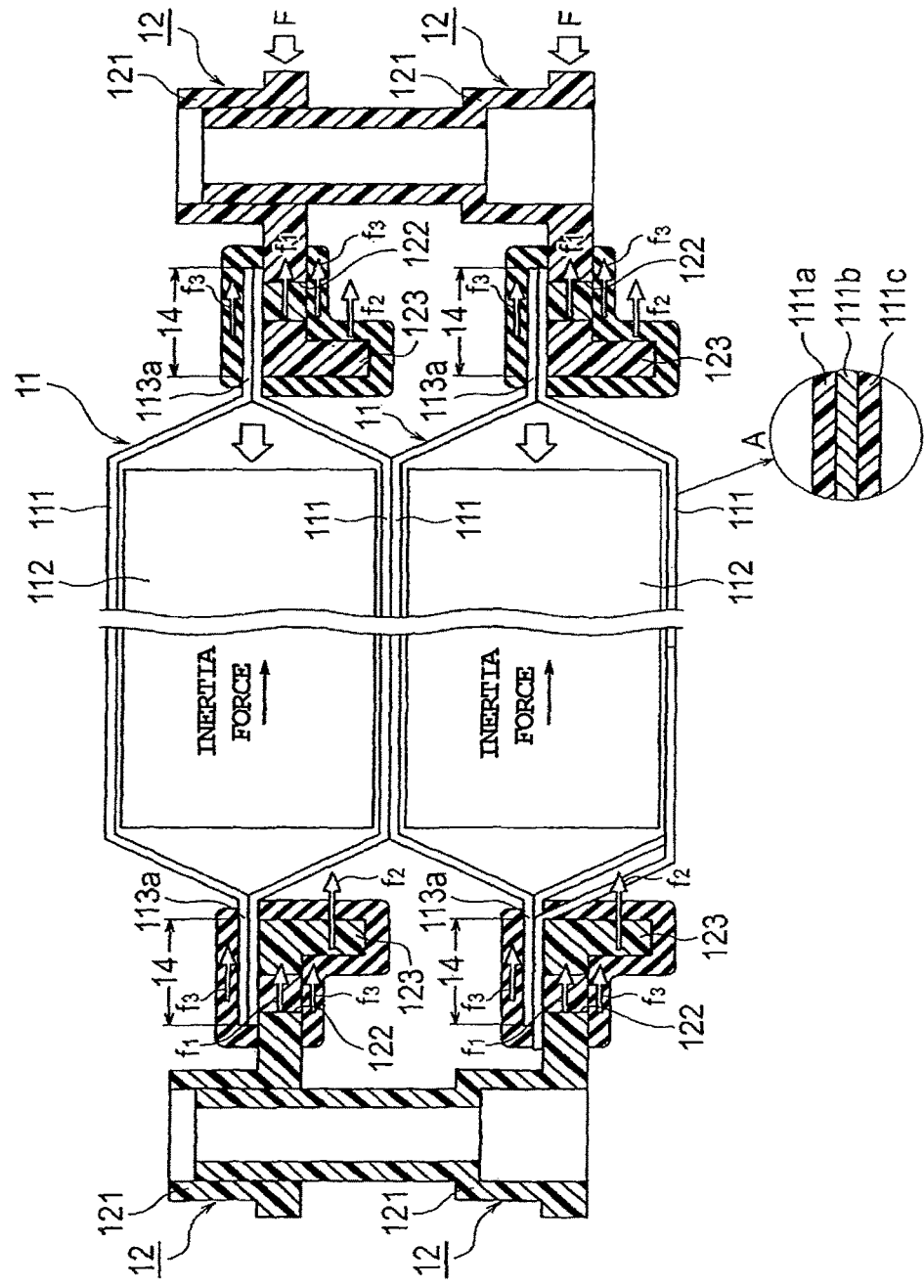
FIG. 5 is a sectional view of the secondary battery, taken along line V-V shown in FIG. 1.

In a case where a plurality of battery bodies 11 are connected with each other to form a battery module, the plurality of battery bodies 11 are stacked on each other such that main surfaces thereof face to each other as shown in FIG. 4, and are accommodated in a battery case. In this case, spacer 12 made of an insulating material is used in order to ensure insulation between positive electrode terminal 114 and negative electrode terminal 115 derived from outer peripheral portion 113a of other battery body 11 and positive electrode terminal 114 and negative electrode terminal 115 derived from outer peripheral portion 113a of battery body 11 stacked on the battery body 11, and arrange a bus bar for connecting these positive electrode terminals 114 and negative electrode terminals 115 in series and/or in parallel to each other and a connector of a voltage detection sensor.

As shown in FIG. 1, FIG. 2 and FIG. 5, spacer 12 of this embodiment is disposed between opposed outer peripheral portions 113a, 113a of battery bodies 11 adjacent to each other. Spacer 12 includes fixing portions 121 for fixing battery body 11 to a casing of a battery module or a predetermined installation place.

Spacer 12 is formed of an insulating resin material having a rigidity such as polybutylene terephthalate (PBT) and polypropylene (PP), and has an elongated bar-shape having a length not less than a length of outer peripheral portion 113a of battery body 11. Disposed on both end portions of spacer 12 are sheathe-shaped fixing portions 121 each having a through hole. It is desired that a length of spacer 12 is not less than that of outer peripheral portion 113a to which spacer 12 is attached. The reason for thus setting the length of spacer 12 is that an external force inputted to spacer 12 is received by spacer 12 as a whole to thereby prevent battery body 11 from undergoing a local stress. Accordingly, the length of spacer 12 may be as close as possible to the length of outer peripheral portion 113a to which spacer 12 is attached.

Further, it is desired that a mechanical strength (rigidity such as bending strength and buckling strength) of spacer 12 formed of PBT or PP as described above is set to be larger than a mechanical strength of the electrode plate (positive electrode plate 112a and negative electrode plate 112b as described above) constituting electric power generating element 112 that is accommodated in battery body 11. In particular, it is desired that the mechanical strength of spacer 12 in an input direction of external force F as shown in FIG. 5 is set to be larger than that of the electrode plate. By setting the mechanical strength of spacer 12 as described above, spacer 12 can be more collapsible than electric power generating element 112 when spacer 12 and electric power generating element 112 are brought into contact with each other and both are collapsed due to application of an considerably excessive external force to fixed secondary battery 1 through spacer 12. As a result, retention stability of secondary battery 1 can be ensured.

Figure 3:
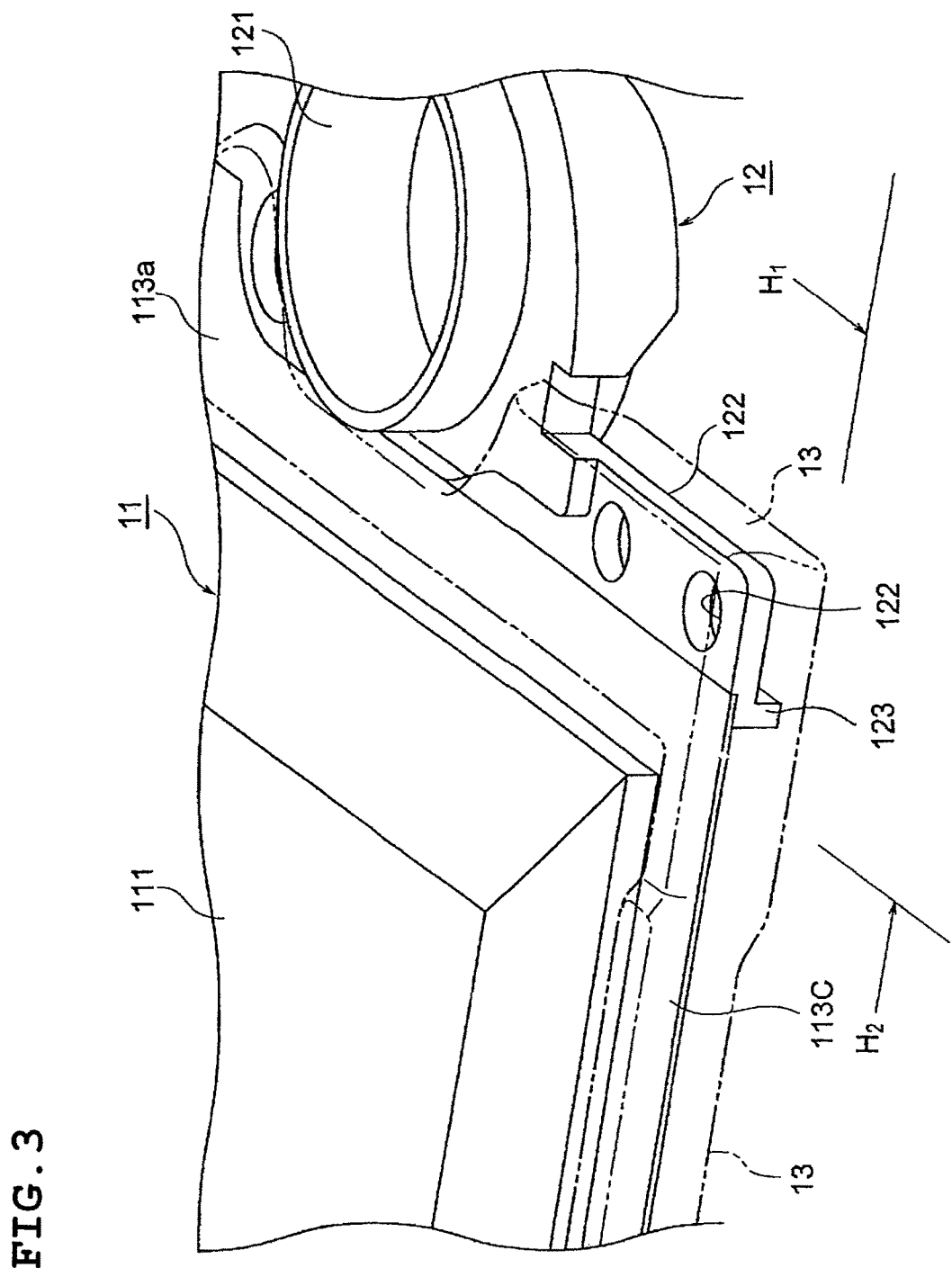
FIG. 3 is a perspective view of the secondary battery shown in FIG. 1 when viewed from a direction as indicated by arrow III.

Formed in the vicinity of fixing portions 121 of spacer 12 of this embodiment are through holes 122 and ribs 123. Through holes 122 and ribs 123 are shown in FIG. 3 and FIG. 5, but illustration thereof is omitted in FIG. 1, FIG. 2 and FIG. 4. Through holes 122 of this embodiment are formed in both end portions of spacer 12 and in optional portions of peripheries of fixing portions 121. Ribs 123 of this embodiment are formed on the end portions of spacer 12 so as to downwardly project from a lower surface of spacer 12.

Through holes 122 and ribs 123 of this embodiment are embedded in elastic resin portion 13 as explained later, and may be configured to have a surface that serves to generate a damping force of elastic resin portion 13 when the external force inputted to fixing portions 121 of spacer 12 is inputted to battery body 11 through elastic resin portion 13. That is, through holes 122 and ribs 123 may be in the form of through holes, ribs or recessed portions each having a surface opposed to the input direction of the external force F as shown in FIG. 5. A damping force relative to the external force F is generated in elastic resin portion 13 even in a case where the through hole, rib or recessed portion is not provided. However, as explained later, with the provision of through holes, ribs or recessed portions, damping forces f1, f2 relative to the external force F are increased as shown in FIG. 5, so that the external force F acting on battery body 11 can be damped. In this sense, through holes 122 and ribs 123 are also referred to as reinforcing portions.

In secondary battery 1 of this embodiment, elastic resin portion 13 is formed in at least a region of outer peripheral portion 113 of battery body 11 which includes a periphery of each of fixing portions 121 and overlap portion 14 of outer peripheral portion 113 and spacer 12 as shown in the sectional view of FIG. 5. Elastic resin portion 13 is formed by insert molding of an elastic resin.

Elastic resin portion 13 is formed of an elastic resin such as vulcanized rubbers, thermosetting resin elastomers, thermoplastic resin elastomers and polyamide-based resins (hot melt-grade), and formed in the above region by insert molding as explained later. In this embodiment, as shown in FIG. 2, elastic resin portion 13 is formed not only in peripheral region H1 of fixing portions 121 but also in region H2 of outer peripheral portions 113c, 113d (long side outer peripheral portions) of battery body 11. Further, elastic resin portion 13 may be formed over a whole periphery of outer peripheral portion 113.

As shown in FIG. 5, elastic resin portion 13 formed in the region H1 as shown in FIG. 2 includes overlap portion 14 in which outer peripheral portion 113a of battery body 11 and spacer 12 are overlapped with each other to thereby connect outer peripheral portion 113a and spacer 12 with each other. Further, the elastic resin is filled in through holes 122 formed in spacer 12. When external force F is inputted to outer peripheral portion 113a of battery body 11 through spacer 12 due to vibration by earthquake or vibration in a large traffic volume place which are inputted to fixing portions 121, damping forces f3, f1, f2 are generated in elastic resin portion 13 itself as well as through holes 122 and ribs 123.

As shown in FIG. 5, when external force F facing in a leftward direction in the drawing is exerted on fixing portions 121, 121 which are disposed at both ends of secondary battery 1 and serves to fix secondary battery 1 relative to the casing of the battery module or the stationary electric power system, the force facing in a leftward direction is also exerted on battery body 11. At this time, electric power generating element 112 sealed in battery body 11 is retained only by connection between positive electrode terminal 114 and outer peripheral portion 113 of exterior package member 111 and between negative electrode terminal 115 and outer peripheral portion 113, and a friction force that is caused between electric power generating element 112 and exterior package member 111 due to reduced pressure in exterior package member 111. Accordingly, when the external force F exerted on fixing portions 121, 121 is transmitted to battery body 11, an inertia force facing in a rightward direction with respect to the external force F is exerted on electric power generating element 112 sealed in battery body 11, thereby causing relative displacement between electric power generating element 112 and exterior package member 111. As a result, there tends to occur such a fear that displacement of current collectors 112d, 112g is caused to thereby induce a short circuit therebetween.

However, in secondary battery 1 of this embodiment, as shown in FIG. 5, spacer 12 is connected with exterior package member 111 of battery body 11 through elastic resin portion 13, and supports battery body 11 at both ends of battery body 11 through elastic resin portion 13. With this construction, when the external force F facing in a leftward direction is exerted on fixing portions 121 of spacer 12 as shown in FIG. 5, damping forces f1-f3 against the external force F acting toward battery body 11 are generated in both elastic resin portions 13, 13 and reduce a force exerted per unit time. As a result, displacement between electric power generating element 112 and exterior package member 111 can be prevented to thereby suppress occurrence of a short circuit between current collectors 112d, 112g. That is, the external force that is inputted to battery body 11 can be damped to thereby enhance stability of battery body 11 in a fixed state. Especially, owing to the elastic force, elastic resin portion 13 is excellent in external force damping function with respect to relatively high frequency vibration such as vibration of earthquake or vibration in a large traffic volume place.

Figure 6:
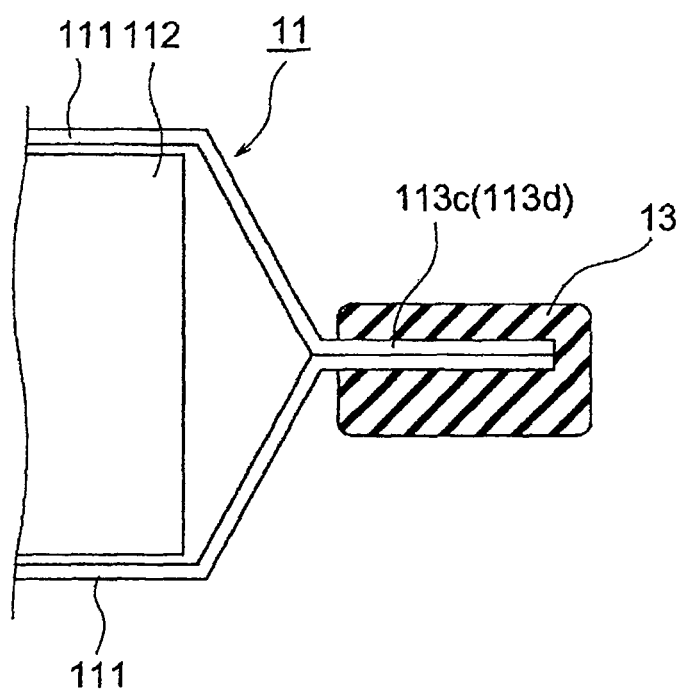
FIG. 6 is a sectional view of the secondary battery, taken along line VI-VI shown in FIG. 1.

In contrast, elastic resin portion 13 formed in the region H2 as shown in FIG. 2 is formed over a whole region of outer peripheral portions 113c, 113d in such a state that elastic resin portion 13 wraps end surfaces of the pair of exterior package members 111 as shown in FIG. 6. With the construction in which elastic resin portion 13 is formed over the whole peripheries of outer peripheral portions 113c, 113d, it is possible to prohibit potential leakage from electric power generating element 112 through the connecting surfaces of outer peripheral portions 113c, 113d. Further, with the construction in which elastic resin portion 13 formed in the region H1 and elastic resin portion 13 formed in the region H2 are connected with each other, a part of the external force F inputted to spacer 12 can be dispersed into elastic resin portion 13 formed in the region H2, so that the external force that is transmitted to battery body 11 can be reduced.

It is desired that a hardness of elastic resin portion 13 formed in the region H1 is smaller than a hardness of outer resin layer 111c constituting exterior package member 111 of battery body 11. The reason for the smaller hardness of elastic resin portion 13 formed in the region H1 is as follows. If the hardness of elastic resin portion 13 is larger than that of outer resin layer 111c of exterior package member 111, in a case where first contact between elastic resin portion 13 and exterior package member 111 is caused due to an excessively large external force exerted on spacer 12 upon input of the external force F, exterior package member 111 will suffer from damage. The hardness of elastic resin portion 13 can be adjusted on the basis of the kind of resin material to be used, change in a grade thereof, etc.

Next, a method for producing secondary battery 1 of the stationary electric power system according to this embodiment will be explained.

First, electric power generating element 112 is accommodated in exterior package member 111 formed of a laminated film, and electrolyte solution is filled in exterior package member 111. Then, outer peripheral portion 113 of exterior package member 111 is sealed to obtain battery body 11. Simultaneously with this step, spacer 12 having fixing portions 121, through holes 122 and rib 123 is molded.

Figure 7:
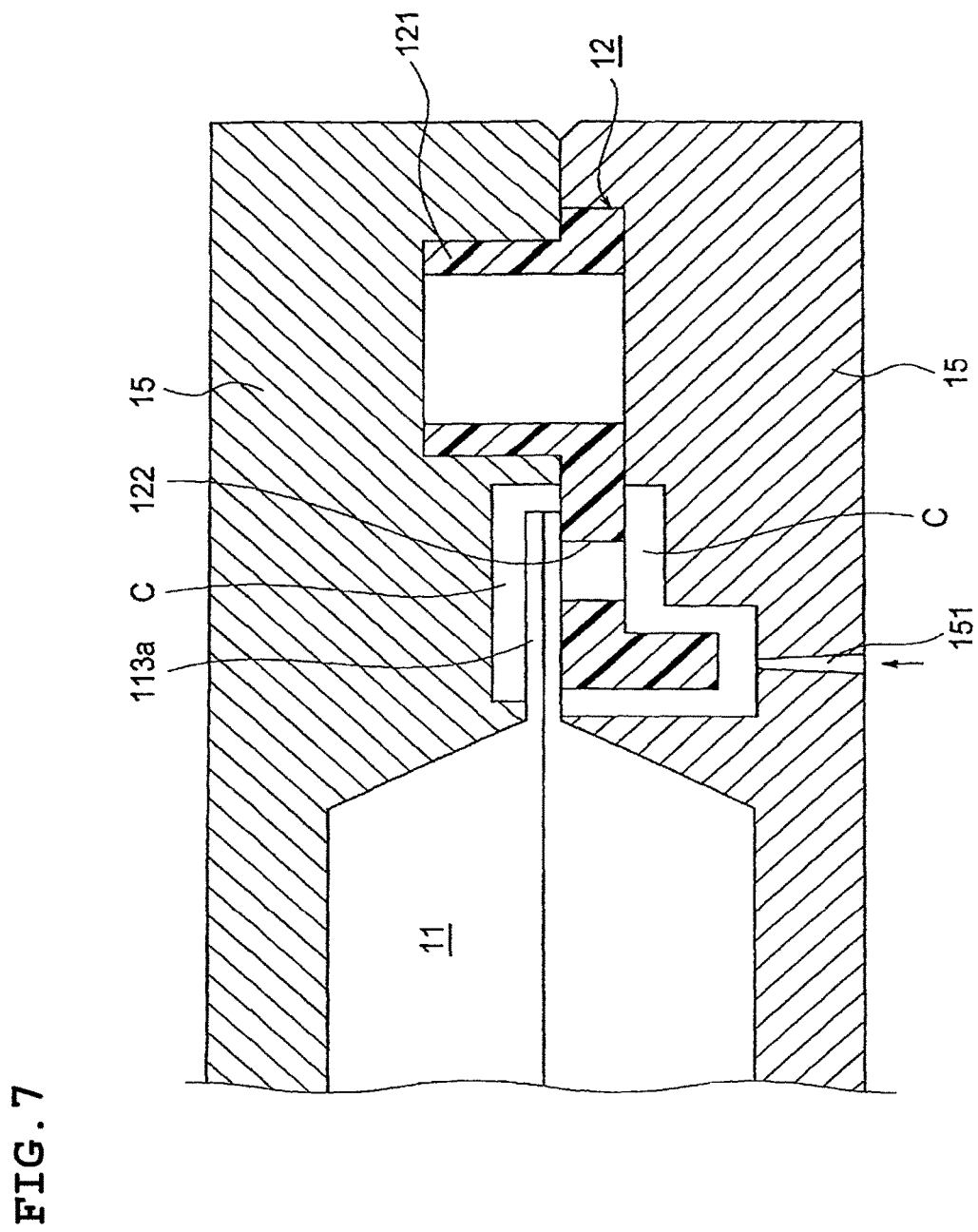
FIG. 7 is a sectional view of an essential part of the secondary battery for explaining a method for producing the secondary battery.

Subsequently, as shown in FIG. 7, battery body 11 and spacer 12 are set in previously prepared injection molding dies 15, 15 in such a state that spacer 12 is overlapped with outer peripheral portion 113a of battery body 11 (outer peripheral portion 113b is not shown), and dies 15, 15 are closed. By carrying out this step, cavity C corresponding to elastic resin portions 13 to be formed in the regions H1, H2 is formed between dies 15, 15. A molten resin is filled in the cavity C through sprue 151. As a result, upon thus filling the resin, the resin is also filled in through holes 122 formed in spacer 12.

Figure 9:
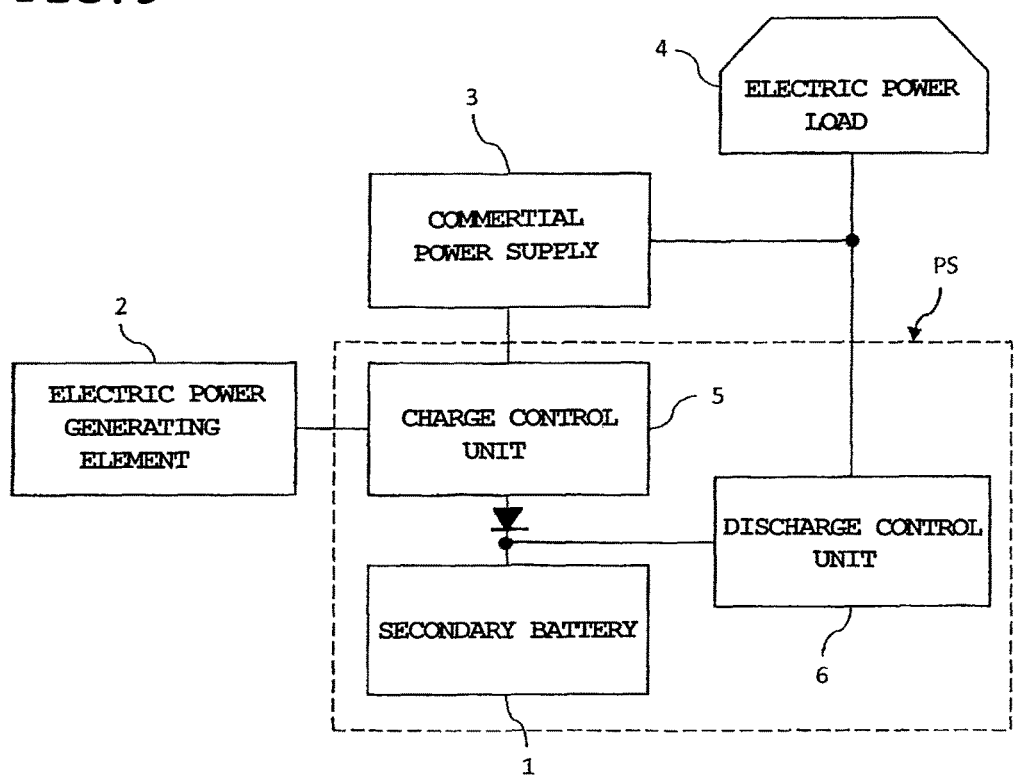
FIG. 9 is a block diagram showing the stationary electric power system according to the embodiment of the present invention.

FIG. 9 is a block diagram showing stationary electric power system PS of the stationary electric power system according to an embodiment of the present invention. Stationary electric power system PS includes secondary battery 1 as described above, charge control unit 5 that charges secondary battery 1 with electric power of external electric power generating element 2 or commercial power supply 3, and discharge control unit 6 that discharges the electric power of secondary battery 1 to electric power load 4. Stationary electric power system PS of this embodiment is a system that stores electric power generated at external electric power generating element 2 in secondary battery 1 and serves as an alternative power supply to commercial power supply 3 or a backup power supply when commercial power supply 3 is interrupted.

External electric power generating element 2 may include various types of electric power generating devices such as a photovoltaic power generating device, a wind power generating device, a geothermal power generating device, and a wave activated power generating device. External electric power generating element 2 is classified into a direct current power generating type and an alternating current power generating type on the basis of characteristic thereof, but both of the types can be used in the present invention.

Commercial power supply 3 is an alternating current power supply having a frequency of 50 Hz or 60 Hz in Japan, and is electrically connected to each of electric power load 4 and charge control unit 5 to which electric power is supplied.

Electric power load 4 may include an architecture such as a house and a building, various kinds of machines, an electric vehicle, etc. Electric power load 4 is classified into a direct current power supplied type and an alternating current power supplied type on the basis of characteristic thereof, but both of the types can be used in the present invention.

Charge control unit 5 serves for charging secondary battery 1 with the electric power of external electric power generating element 2 and/or commercial power supply 3. A DC/DC converter can be used for external electric power generating element 2 that generates a direct current power, and an AC/DC converter can be used for external electric power generating element 2 that generates an alternating current power, and commercial power supply 3.

Charge control unit 5 controls charging process in accordance with a state of charge of secondary battery 1, a power output condition of external electric power generating element 2 or commercial power supply 3, and the like.

Discharge control unit 6 serves for discharging a direct current power of secondary battery 1 to electric power load 4. A DC/AC converter can be used for electric power load 4 to which an alternating current power is to be supplied, and a DC/DC converter can be used for electric power load 4 to which a direct current power is to be supplied. Discharge control unit 6 controls discharging process in accordance with a state of charge of secondary battery 1, a requested electric power condition of electric power load 4, and the like.

Secondary battery 1 may be constituted of secondary battery 1 solely as explained by referring to FIGS. 1-8, or may be in the form of a battery module in which a plurality of secondary batteries 1 are combined with each other or a battery pack in which a plurality of battery modules are combined with each other. Battery body 11 is arranged horizontally or perpendicularly with respect to an installation place therefor, or in a combination of the horizontal arrangement and the perpendicular arrangement.

Stationary electric power system PS of this embodiment in which secondary battery 1, charge control unit 5 and discharge control unit 6 may be accommodated together in a case or respective cases, is used in a stationary state in the vicinity of electric power load 4. In addition, stationary electric power system PS may be constructed to be portable depending on the place in which electric power load 4 is located, and be set and used in the place in a stationary state.

In stationary electric power system PS of this embodiment, an electric power generated by external electric power generating element 2 such as a photovoltaic power generating device is stored in secondary battery 1 by charge control unit 5, and the electric power stored in secondary battery 1 is supplied to electric power load 4 by discharge control unit 6 instead of commercial power supply 3 or when commercial power supply 3 is interrupted. With this construction, stationary electric power system PS can serve as an alternative power supply of commercial power supply 3 or a backup power supply of commercial power supply 3.

Further, in stationary electric power system PS shown in FIG. 9, charge control unit 5 or discharge control unit 6 can be omitted. For example, the stationary electric power system may be constituted of secondary battery 1 and charge control unit 5, serving as an electrical storage device that stores the electric power from external electric power generating element 2 or commercial power supply 3 in secondary battery 1. Further, the thus-constructed stationary electric power system may be connected to electric power load 4 equipped with discharge control unit 6 to thereby supply the electric power stored in secondary battery 1 to electric power load 4. Further, the stationary electric power system may be constituted of secondary battery 1 and discharge control unit 6, serving as a discharge device that discharges the electric power stored in secondary battery 1 to electric power load 4. Further, the thus-constructed stationary electric power system may be connected to power supplies 2, 3 equipped with charge control unit 5 to thereby charge secondary battery 1. Furthermore, charge control unit 5 and discharge control unit 6 can be constructed as a single charge/discharge control unit.

As explained above, in the stationary electric power system of this embodiment, elastic resin portion 13 is formed in at least the region H1 located on the periphery of fixing portion 121 of secondary battery 1. With this construction, as shown in FIG. 5, when external force F inputted through fixing portion 121 is inputted to battery body 11 through spacer 12, damping force f3 is generated in elastic resin portion 13 per se. As a result, the external force inputted to battery body 11 can be damped so that stability of the fixed state of battery body 11 can be enhanced. Particularly, the stationary electric power system of this embodiment is excellent in external force damping function with respect to relatively high frequency vibration such as vibration of earthquake and vibration in a large traffic volume place owing to the elastic force of elastic resin portion 13.

In addition, upon input of the external force, damping forces f1, f2 are generated in through holes 122 and rib 123 formed in spacer 12, respectively. Therefore, it is possible to further effectively damp the external force inputted to battery body 11 and further enhance the stability of the fixed state of battery body 11.

Further, since the length of spacer 12 is set to be not shorter than the length of outer peripheral portion 113a, the external force F inputted to spacer 12 can be received by the whole portion of spacer 12. It is possible to suppress concentration of stress in a local area of battery body 11.

Further, the hardness of elastic resin portion 13 formed in the respective regions H1, H2 is set to a hardness smaller than the hardness of outer resin layer 111c constituting exterior package member 111 of battery body 11. With this construction, when an excessively large external force is exerted on spacer 12 to thereby cause contact between elastic resin portion 13 and exterior package member 111 upon occurrence of large earthquake, exterior package member 111 can be prevented from suffering from damage by the contact with elastic resin portion 13.

Further, the mechanical strength of spacer 12 is set to be larger than the mechanical strength of the electrode plates of electric power generating element 112. With this construction, when an excessively large external force is exerted on spacer 12 to thereby cause contact between spacer 12 and electric power generating element 112 and collapse of both thereof upon occurrence of large earthquake, spacer 12 can be hard to collapse rather than electric power generating element 112. As a result, it is possible to ensure a retention stability of secondary battery 1.

Further, with the provision of elastic resin portion 13 formed in the region H2, potential leakage from electric power generating element 112 through the connecting surface of outer peripheral portions 113c, 113d can be prohibited so that reduction of capacity of secondary battery 1 can be suppressed. Further, elastic resin portion 13 formed in the region H1 and elastic resin portion 13 formed in the region H2 are connected with each other to thereby disperse a part of the external force F inputted to spacer 12 to elastic resin portion 13 formed in the region H2. As a result, the external force that is transmitted to battery body 11 can be reduced.

Furthermore, since elastic resin portion 13 is formed by insert molding, the production cost and the number of production steps can be reduced, thereby serving for reducing the costs for production of secondary battery 1.

Second Embodiment

Figure 10:
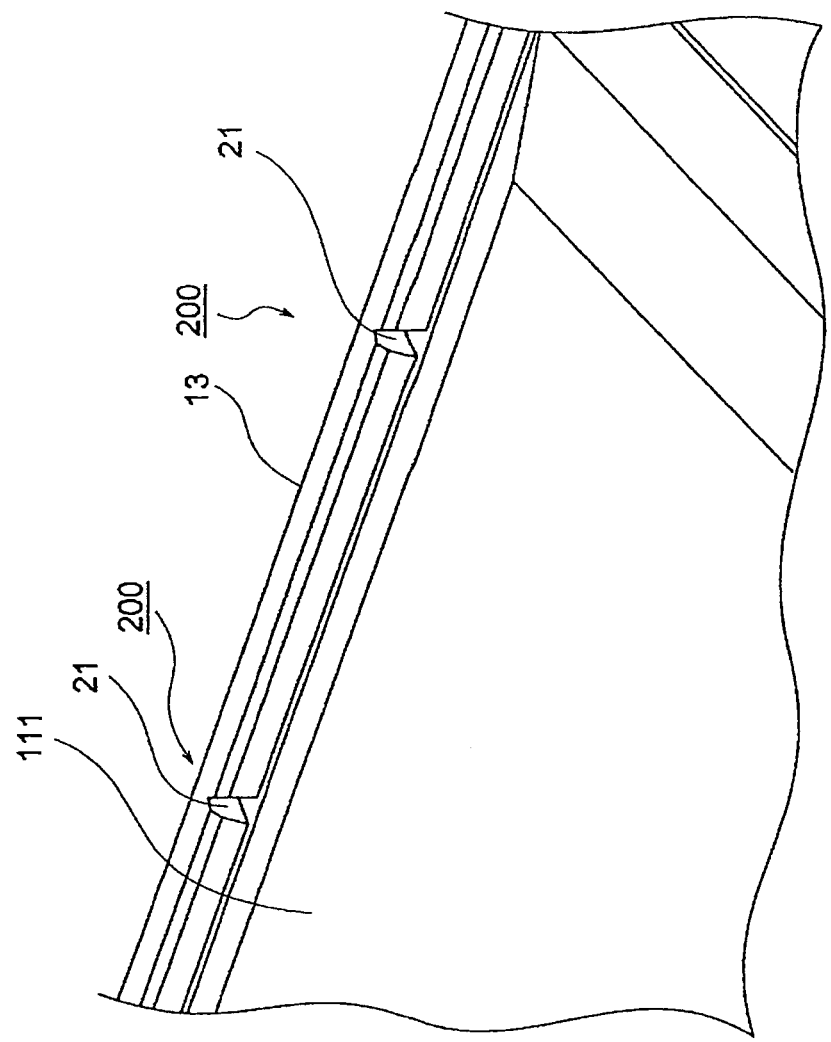
FIG. 10 is an enlarged view of a secondary battery according to another embodiment of the present invention, showing a part thereof which corresponds to a portion surrounded by line IX shown in FIG. 1.
Figure 11:
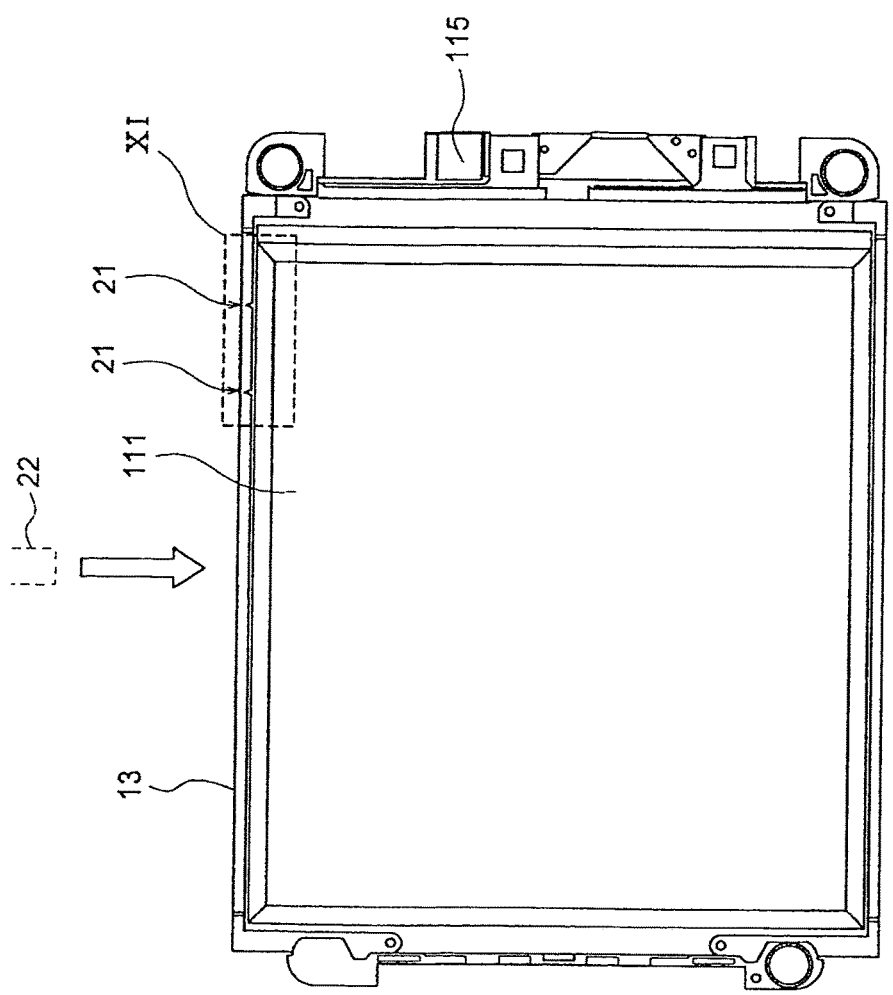
FIG. 11 is a plan view of the secondary battery according to another embodiment of the present invention.
Figure 12:
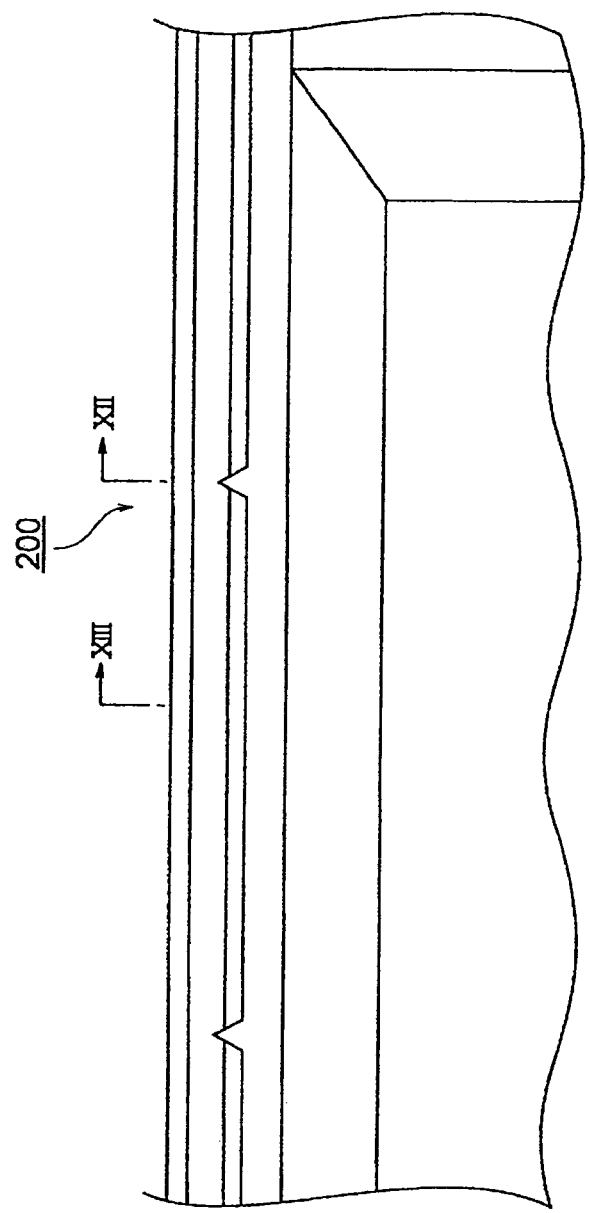
FIG. 12 is an enlarged view of a part of the secondary battery which is surrounded by line XI shown in FIG. 11.

FIG. 10 is an enlarged view of a secondary battery of stationary electric power system PS according to another embodiment of the present invention, showing a part thereof which corresponds to a portion surrounded by line IX shown in FIG. 1. FIG. 11 is a plan view of the secondary battery according to another embodiment of the present invention. FIG. 12 is an enlarged view of a part of the secondary battery which is surrounded by line XI shown in FIG. 11. This embodiment of the present invention differs from the above-described first embodiment in that fragile portion 200 is provided. This embodiment of the present invention has the same construction as that of the first embodiment except for the above structure, and therefore, the description concerning the same construction as that of the first embodiment is applied as such thereto.

Fragile portion 200 is provided in elastic resin portion 13 formed in the outer peripheral portion of exterior package member 111. Fragile portion 200 is formed by cutout portion 21 that is cut into a V shape when viewed from a direction of the main surface of secondary battery 1. Further, cutout portion 21 is formed so as to cut out elastic resin portion 13 from a portion of an inner wall of elastic resin portion 13 which is opposed to a central portion of secondary battery 1 toward an outer wall thereof opposed to an outside portion of secondary battery 1. Further, cutout portion 21 is formed in a part of elastic resin portion 13 which extends from the inner wall to the outer wall.

In addition, cutout portion 21 is formed on a downstream side of an elastic resin as a material that forms elastic resin portion 13. As shown in FIG. 11, when elastic resin portion 13 is formed by insert molding, injection port 22 through which the elastic resin is to be injected is arranged in a central portion of the long side of exterior package member 111, and the elastic resin is flowed along the outer peripheral portion of exterior package member 111. At this time, an upstream side of the elastic resin is located on the position of injection port 22, and the downstream side of the elastic resin is located on an end portion of the long side of exterior package member 111. Therefore, cutout portion 21 is formed in a position on a downstream side with respect to the injection port of the elastic resin. Further, cutout portion 21 is formed in a portion of elastic resin portion 13 which covers one of four sides of exterior package member 111 from which positive electrode terminal 114 and negative electrode terminal 115 are not derived.

Figure 13:
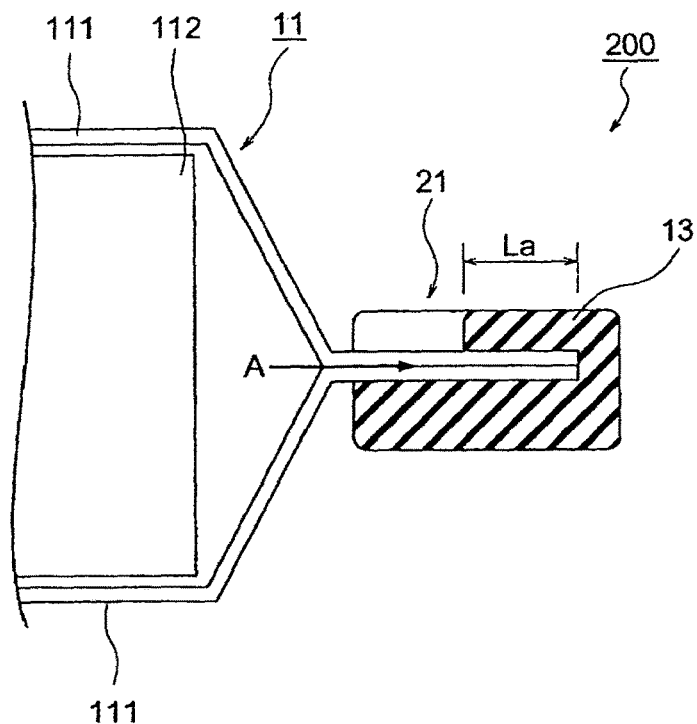
FIG. 13 is a sectional view taken along line XII-XII shown in FIG. 12.
Figure 14:
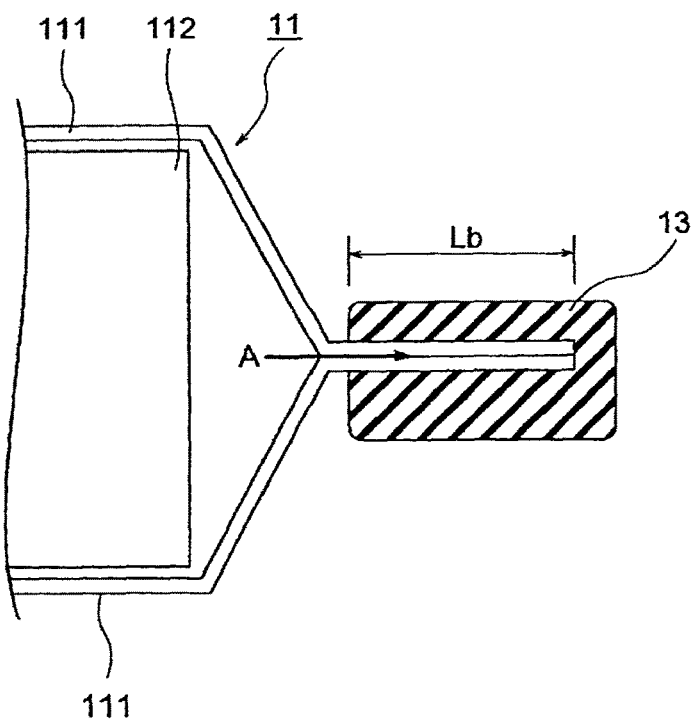
FIG. 14 is a sectional view taken along line shown in FIG. 12.

Next, a function of fragile portion 200 is explained by referring to FIG. 13 and FIG. 14. FIG. 13 is a sectional view of a portion of the fragile portion in which cutout portion 21 is included, taken along line XII-XII shown in FIG. 12. FIG. 14 is a sectional view of a portion of the fragile portion in which cutout portion 21 is not included, taken along line XIII-XIII shown in FIG. 12.

As shown in FIG. 13 and FIG. 14, in the outer peripheral portions of a pair of exterior package members 111, a contact area between upper side exterior package member 111 of the pair of exterior package members 111 and elastic resin portion 13 in which cutout portion 21 is formed is smaller than a contact area between the upper side exterior package member 111 and elastic resin portion 13 in which cutout portion 21 is not formed. In other words, an interface between the upper side exterior package member 111 and a portion of elastic resin portion 13 in which cutout portion 21 is formed, has a length (La shown in FIG. 13) from one end located on an outer side of the upper side exterior package member 111 to the other end located on an inner side of the upper side exterior package member 111 which is shorter than a length (Lb shown in FIG. 14) of an interface between the upper side exterior package member 111 and a portion of elastic resin portion 13 in which cutout portion 21 is not formed. That is, in secondary battery 1 of this embodiment, with the provision of cutout portion 21, a contact area between the upper side exterior package member 111 and the portion of elastic resin portion 13 in which cutout portion 21 is formed per unit area in the interface therebetween is smaller than the contact area between the portion of the upper side exterior package member 111 and the portion of elastic resin portion 13 in which cutout portion 21 is not formed per unit area in the interface therebetween. As a result, an adhesion strength of elastic resin portion 13 to the upper side exterior package member 111 can be reduced so that the portion of elastic resin portion 13 in which cutout portion 21 is formed can serve as fragile portion 200.

In a case where a gas is generated from electric power generating element 112 due to deterioration of secondary battery 1 with time, the gas is allowed to flow outwardly from the outer peripheral portions of exterior package members 111 in which the electric power generating element is sealed by exterior package members 111, that is, from an overlap portion (heat-sealed portion) in which upper side exterior package member 111 of the pair of exterior package members 111 and lower side exterior package member 111 thereof are overlapped with each other, as indicated by arrows A in FIG. 13 and FIG. 14. One outer end of the overlap portion in which the upper side exterior package member 111 and the lower side exterior package member 111 are overlapped with each other, is covered with elastic resin portion 13, so that a shearing strength corresponding to a strength of a base material of elastic resin portion 13 becomes higher than the adhesion strength of elastic resin portion 13 to exterior package member 111. Therefore, the gas is allowed to flow along the interface between elastic resin portion 13 and exterior package member 111 in a direction opposite to the direction of the gas flow at the overlap portion of exterior package members 111. At this time, the length of the interface between exterior package member 111 and the portion of elastic resin portion 13 formed with cutout portion 21 which extends from the one outer end of the interface to the other inner end of the interface is shorter than the length of the interface between exterior package member 111 and the portion of elastic resin portion 13 formed with no cutout portion. For this reason, as compared to the portion of elastic resin portion 13 formed with no cutout portion, the gas can be readily discharged from the portion of elastic resin portion 13 formed with cutout portion 21. As a result, cutout portion 21 serves as a discharge port of the gas that is generated from electric power generating element 112.

That is, in this embodiment, by forming cutout portion 21 in a portion of elastic resin portion 13 on the interface between elastic resin portion 13 and exterior package members 111, the portion of elastic resin portion 13 formed with cutout portion 21 is made fragile, so that the gas is readily discharged from cutout portion 21 as compared to the other portion of elastic resin portion 13 formed with no cutout portion. In a case where cutout portion 21 are not formed in elastic resin portion 13, when a gas is generated from electric power generating element 112, an outlet from which the gas is released cannot be specifically determined to thereby cause increase in internal pressure of exterior package member 111. On the other hand, in this embodiment, with the provision of cutout portion 21, a portion in the vicinity of cutout portion 21 serves as fragile portion 200. As a result, the outlet from which the generated gas is released can be determined so that the generated gas can be discharged from the outlet before the internal pressure of exterior package member 111 is excessively increased.

As described above, in secondary battery 1 of stationary electric power system PS according to this embodiment, fragile portion 200 with cutout portion 21 is formed in elastic resin portion 13. With this construction, in a case where a gas is generated from electric power generating element 112, the generated gas can be released before an internal pressure of secondary battery 1 is excessively increased. Specifically, in the interface between exterior package member 111 and elastic resin portion 13, a peripheral region including fragile portion 200 has an adhesion strength smaller than a region except for the peripheral region, and therefore, the peripheral region becomes fragile. When a gas is generated, the gas is discharged from the peripheral region so that a rise in internal pressure of exterior package member 111 can be suppressed.

Further, in secondary battery 1 of stationary electric power system PS according to this embodiment, cutout portion 21 is formed in the portion of elastic resin portion 13 which is located on an inside of the outer peripheral portion of exterior package member 111. With this construction, the gas that is generated from electric power generating element 112 is discharged not toward an outside of the outer peripheral portion of exterior package member 111 but toward the inside of the outer peripheral portion of exterior package member 111. Therefore, it is possible to suppress an adverse influence on other batteries due to the generated gas.

Further, in secondary battery 1 of stationary electric power system PS according to this embodiment, cutout portion 21 is formed in the portion of elastic resin portion 13 which is located on a part of the outer peripheral portion of exterior package member 111 except for a part of the outer peripheral portion of exterior package member 111 from which positive electrode terminal 114 and negative electrode terminal 115 are derived. With this construction, the gas is discharged from the part of the outer peripheral portion of exterior package member 111 from which positive electrode terminal 114 and negative electrode terminal 115 are not derived. Therefore, it is possible to suppress an adverse influence on positive electrode terminal 114 and negative electrode terminal 115 due to the discharged gas.

Further, in secondary battery 1 of stationary electric power system PS according to this embodiment, fragile portion 200 in which cutout portion 21 is formed is constructed such that the adhesion strength (adhesion strength of the contacting portion between exterior package member 111 and elastic resin portion 13 corresponding to the length La shown in FIG. 13) is smaller than a strength of a base material of elastic resin portion 13. With this construction, in a case where a gas is discharged from the overlap portion in which the pair of exterior package members 111 are overlapped with each other by heat seal, the gas can be flowed along the interface between exterior package member 111 and elastic resin portion 13 and discharged from cutout portion 21 without shearing elastic resin portion 13 and being discharged to an outside.

Further, in secondary battery 1 of stationary electric power system PS according to this embodiment, in a case where elastic resin portion 13 is formed by insert molding an elastic resin, fragile portion 200 is formed on a downstream side of the elastic resin. An adhesion strength in the interface between exterior package member 111 and elastic resin portion 13 on the downstream side of the elastic resin is smaller than that on the upstream side of the elastic resin. For this reason, in this embodiment, fragile portion 200 is formed on the downstream side of the elastic resin, so that the outlet from which the gas is released can be suitably controlled.

Figure 15:
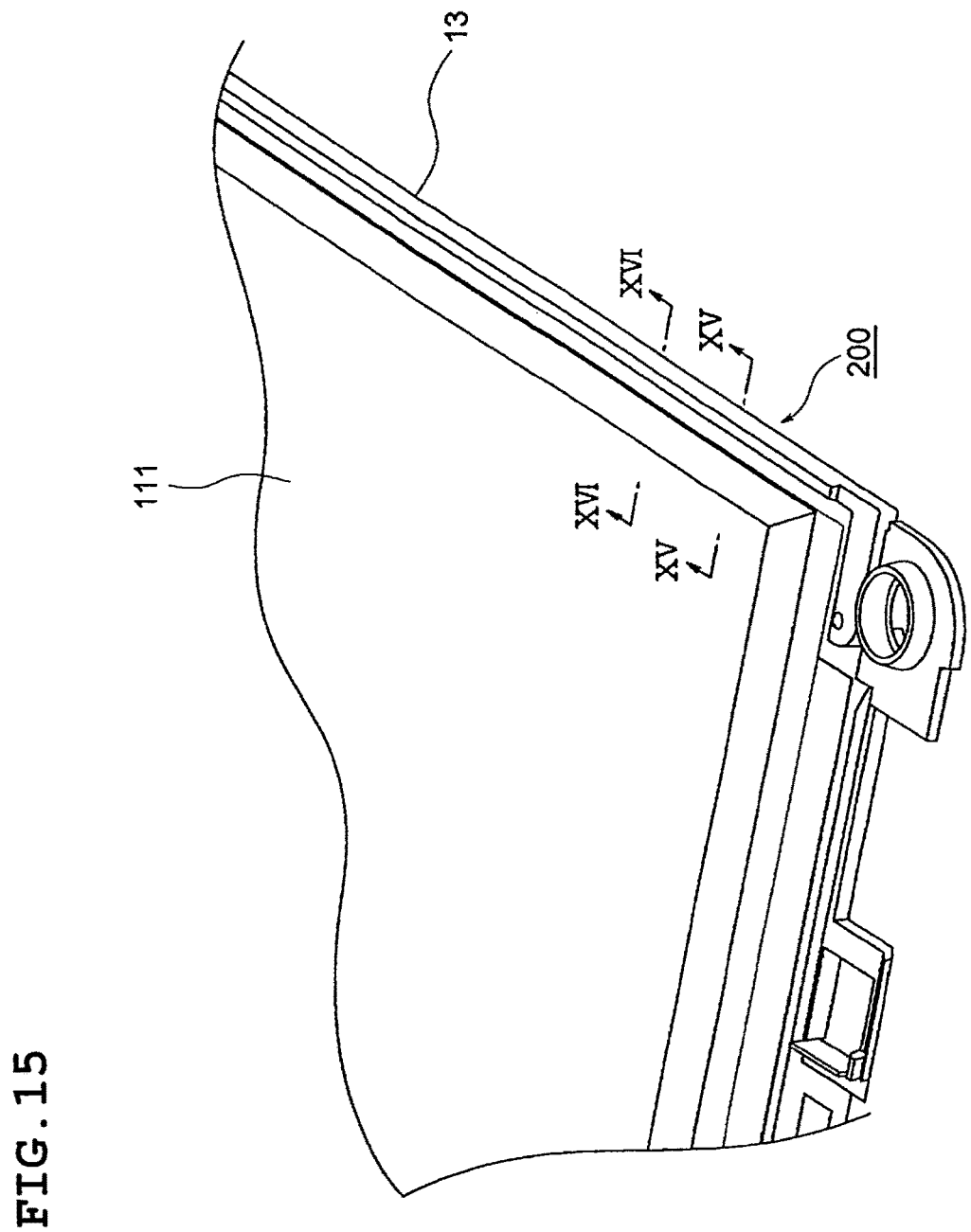
FIG. 15 is a perspective view of a secondary battery according to a further embodiment (modification) of the present invention when viewed from a direction as indicated by arrow XIV shown in FIG. 1.
Figure 16:
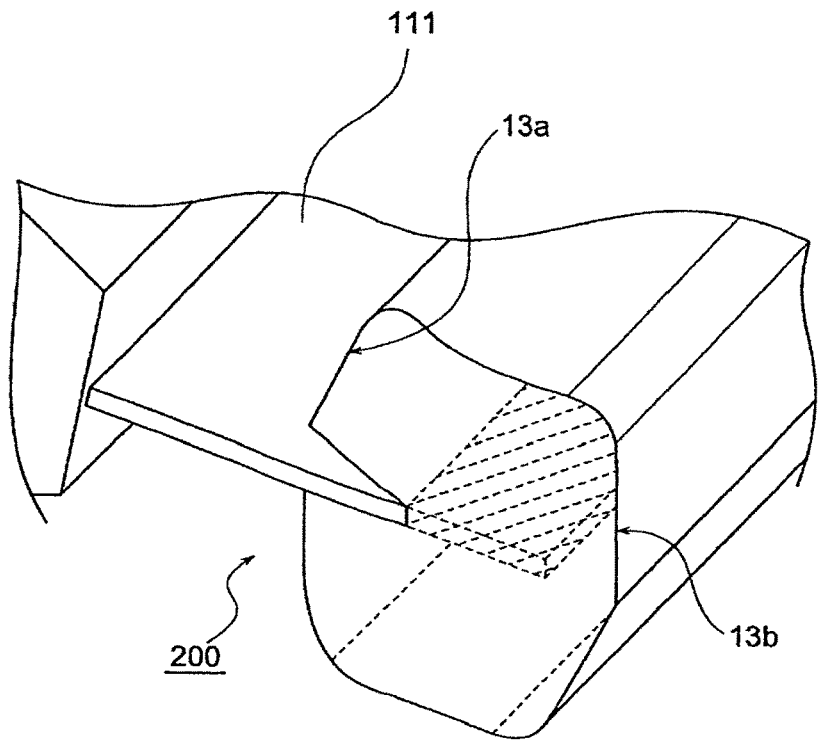
FIG. 16 is a partially sectional perspective view taken along line XV-XV shown in FIG. 15.
Figure 17:
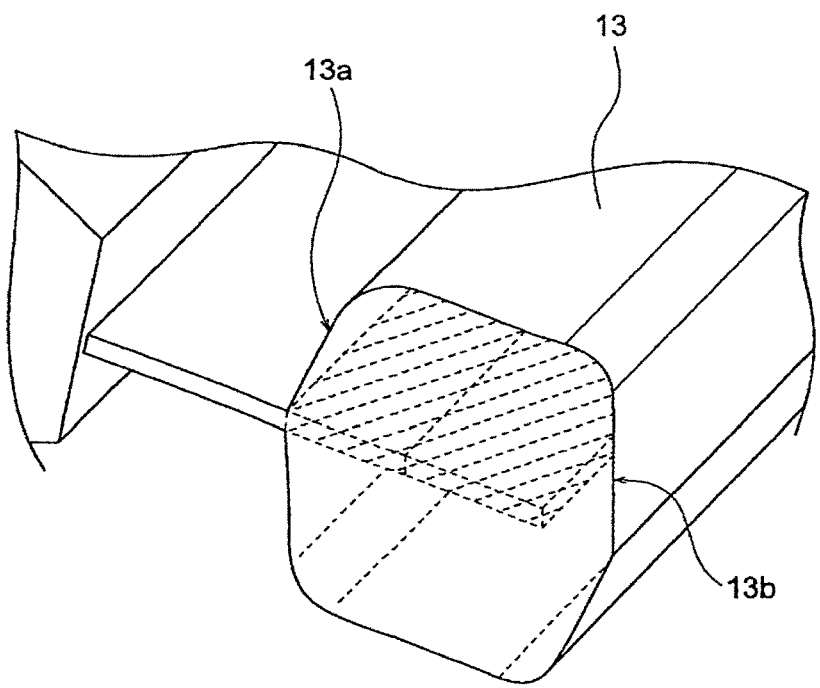
FIG. 17 is a partially sectional perspective view taken along line XVI-XVI shown in FIG. 15.

Although in this embodiment, cutout portion 21 is formed by cutting elastic resin portion 13 into a V shape when viewed from a direction of the main surface of secondary battery 1, cutout portion 21 may be formed by cutting elastic resin portion 13 from a wall surface of elastic resin portion 13 toward an inside of elastic resin portion 13 as shown in FIGS. 15-16. FIG. 15 is a perspective view of secondary battery 1 when viewed from a direction as indicated by arrow XIV shown in FIG. 1. FIG. 16 is a partially sectional perspective view taken along line XV-XV shown in FIG. 15. FIG. 17 is a partially sectional perspective view taken along line XVI-XVI shown in FIG. 15.

Cutout portion 21 is formed by cutting elastic resin portion 13 from inner wall 13a (a wall surface of elastic resin portion 13 which faces the side of the electric power generating element) toward outer wall 13b (a wall surface of elastic resin portion 13 which faces an outside in a direction opposite to the wall surface facing the side of the electric power generating element) such that a height of cutout portion 21 is gradually decreased. Elastic resin portion 13 is not adhered to the upper side exterior package member 111 in a region that extends from inner wall 13a of elastic resin portion 13 to a position located on the route to outer wall 13b of elastic resin portion 13. On the other hand, in the portion of elastic resin portion 13 in which cutout portion 21 is not formed, elastic resin portion 13 is adhered to the upper side exterior package member 111 in a region that extends from inner wall 13a of elastic resin portion 13 to a position located on the route to outer wall 13b of elastic resin portion 13. With this construction, the interface between the upper side exterior package member 111 and a portion of elastic resin portion 13 in which cutout portion 21 is formed, has a length from one end located on an outer side of the upper side exterior package member 111 to the other end located on an inner side of the upper side exterior package member 111 which is shorter than a length of the interface between the upper side exterior package member 111 and a portion of elastic resin portion 13 in which cutout portion 21 is not formed. Thus, cutout portion 21 is formed in inner wall 13a of elastic resin portion 13.

Third Embodiment

Figure 18:
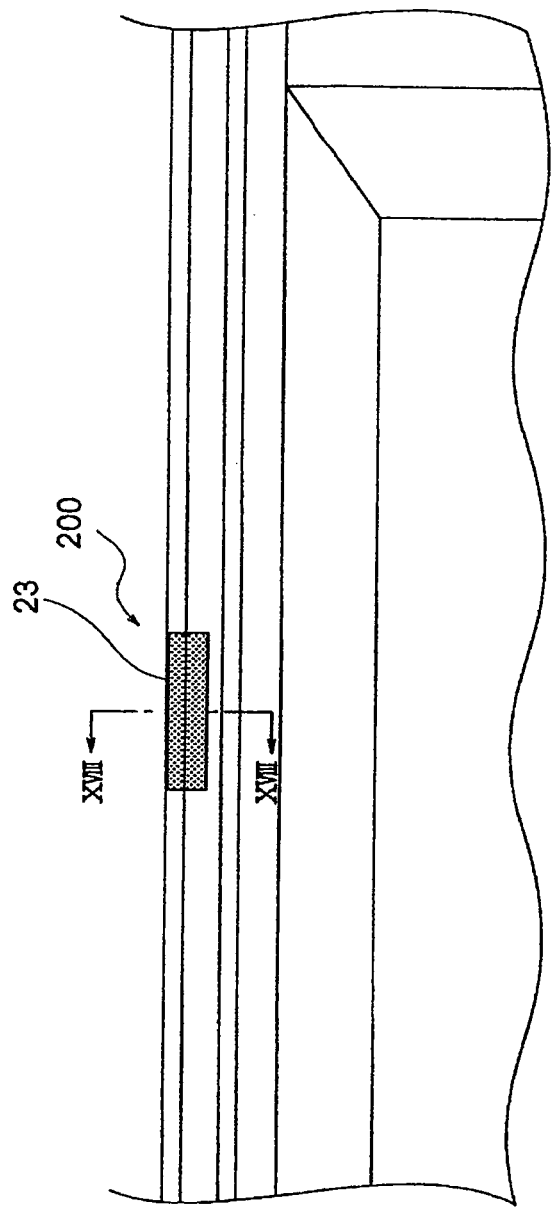
FIG. 18 is an enlarged view of a secondary battery according to a further embodiment of the present invention, showing a part thereof which corresponds to a portion surrounded by line XI shown in FIG. 11.
Figure 19:
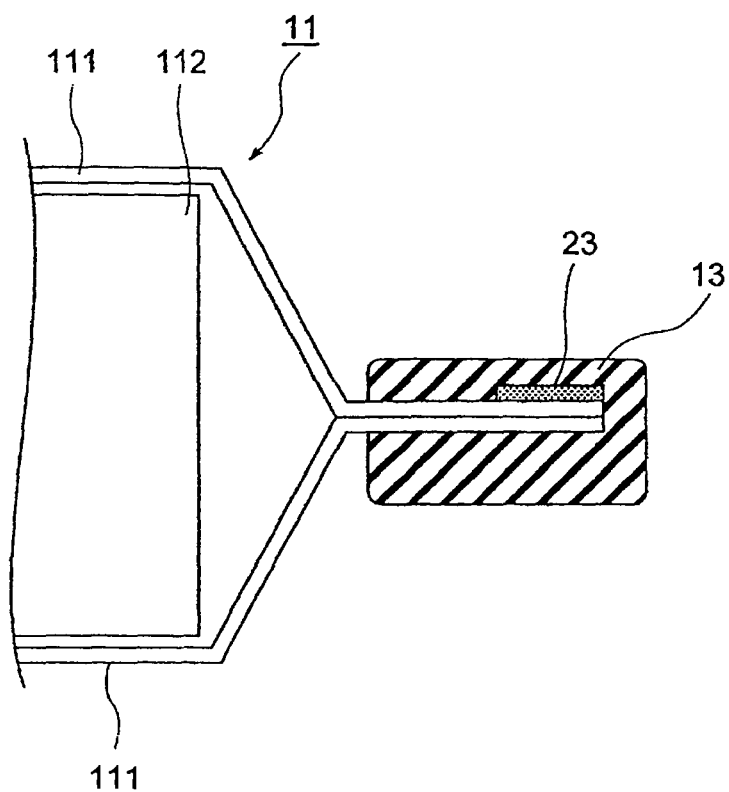
FIG. 19 is a sectional view taken along line XVIII-XVIII shown in FIG. 18.

FIG. 18 is an enlarged view of secondary battery 1 according to a further embodiment of the present invention, showing a part thereof which corresponds to a portion surrounded by dotted line XI shown in FIG. 11. FIG. 19 is a sectional view taken along line XVIII-XVIII shown in FIG. 18. This embodiment differs from the above-described second embodiment in construction of fragile portion 200. This embodiment has the same construction as those of the first embodiment and the second embodiment except for the above structure, and therefore, the description concerning the same construction as those of the first and second embodiments is applied as such thereto.

Fragile portion 200 is provided in elastic resin portion 13 formed in an outer peripheral portion of exterior package member 111. Fragile portion 200 is formed by adhesion strength reduction portion 23. Adhesion strength reduction portion 23 is disposed on the interface between exterior package member 111 and elastic resin portion 13, and formed into a belt shape along the interface. Further, adhesion strength reduction portion 23 is disposed on a part of the interface which extends from one end of the interface which is located on an outer side of outside exterior package member 111 to a position located on the route to the other end of the interface which is located on an inner side of the outside-upper side exterior package member 111.

In a method for producing adhesion strength reduction portion 23, when elastic resin portion 13 is formed on exterior package member 111, a releasing agent such as silicones is blown to a portion of a surface of the outer peripheral portion of exterior package member 111 in which adhesion strength reduction portion 23 is to be produced, by a sprayer, etc., or a tape containing a releasing agent is adhered to the portion of a surface of the outer peripheral portion of exterior package member 111. In this state, elastic resin portion 13 is formed on the outer peripheral portion of exterior package member 111. As a result, the adhesion strength in the interface between elastic resin portion 13 and adhesion strength reduction portion 23 of exterior package member 111 becomes lower than the adhesion strength in the interface between elastic resin portion 13 and a portion of exterior package member 111 except for adhesion strength reduction portion 23.

That is, in this embodiment, adhesion strength reduction portion 23 is provided in elastic resin portion 13 on the interface between elastic resin portion 13 and exterior package member 111. With this construction, as compared to a portion in which adhesion strength reduction portion 23 is not provided, the portion in which adhesion strength reduction portion 23 is provided is made fragile to thereby readily discharge a gas therefrom. In a case where adhesion strength reduction portion 23 is not provided in elastic resin portion 13, when a gas is generated from electric power generating element 112, an outlet from which the gas is released cannot be specifically determined to thereby cause increase in internal pressure of exterior package member 111. On the other hand, in this embodiment, with the provision of adhesion strength reduction portion 23, a portion in the vicinity of adhesion strength reduction portion 23 serves as fragile portion 200. As a result, an outlet for releasing the gas can be defined so that the generated gas can be discharged from the outlet before the internal pressure of exterior package member 111 is excessively increased.

As described above, in secondary battery 1 of stationary electric power system PS according to this embodiment, fragile portion 200 with adhesion strength reduction portion 23 is formed in elastic resin portion 13. With this construction, in a case where a gas is generated from electric power generating element 112, the generated gas can be released before an internal pressure of secondary battery 1 is excessively increased. Specifically, in the interface between exterior package member 111 and elastic resin portion 13, a peripheral region including fragile portion 200 has an adhesion strength smaller than that in a region except for the peripheral region, and therefore, the peripheral region becomes fragile. When a gas is generated, the gas is discharged from the peripheral region so that a rise in internal pressure of exterior package member 111 can be suppressed.

Figure 20:
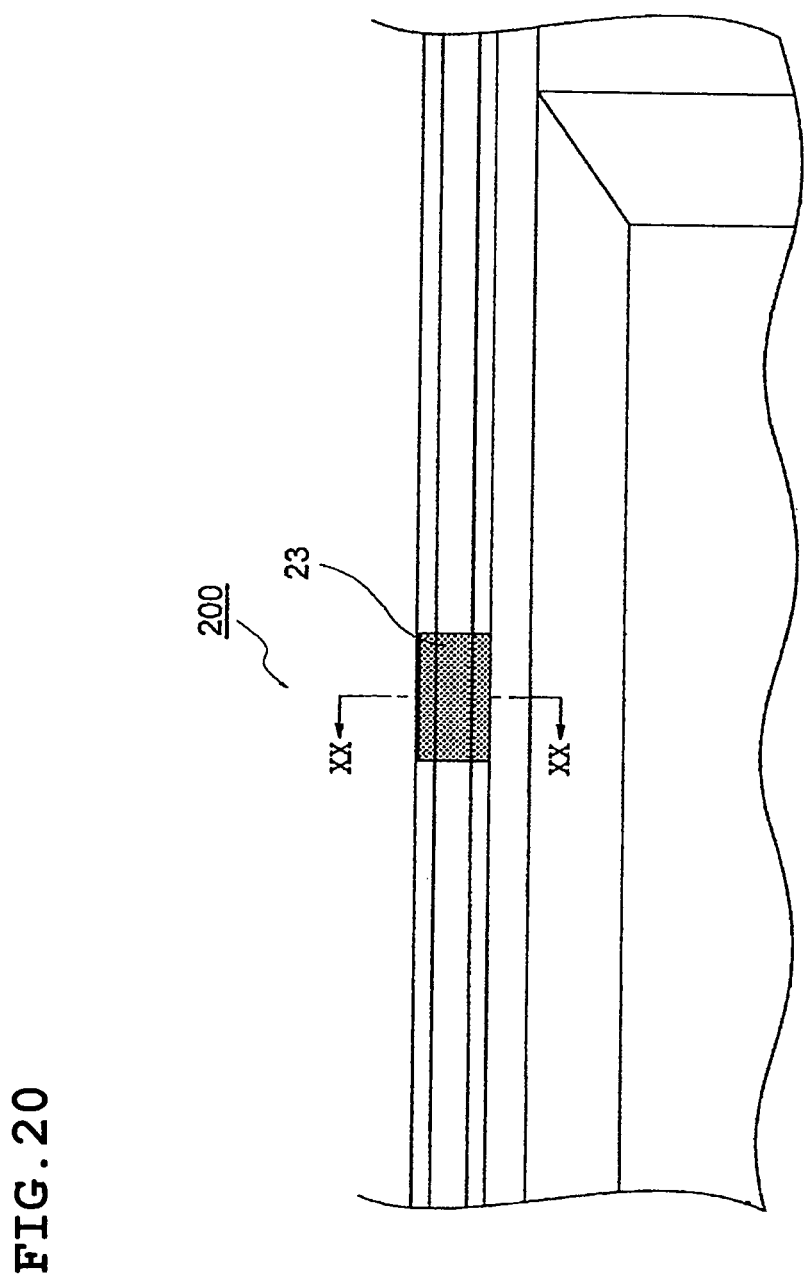
FIG. 20 is an enlarged view of a secondary battery according to a still further embodiment of the present invention, showing a part thereof which corresponds to a portion surrounded by line XI shown in FIG. 11.
Figure 21:
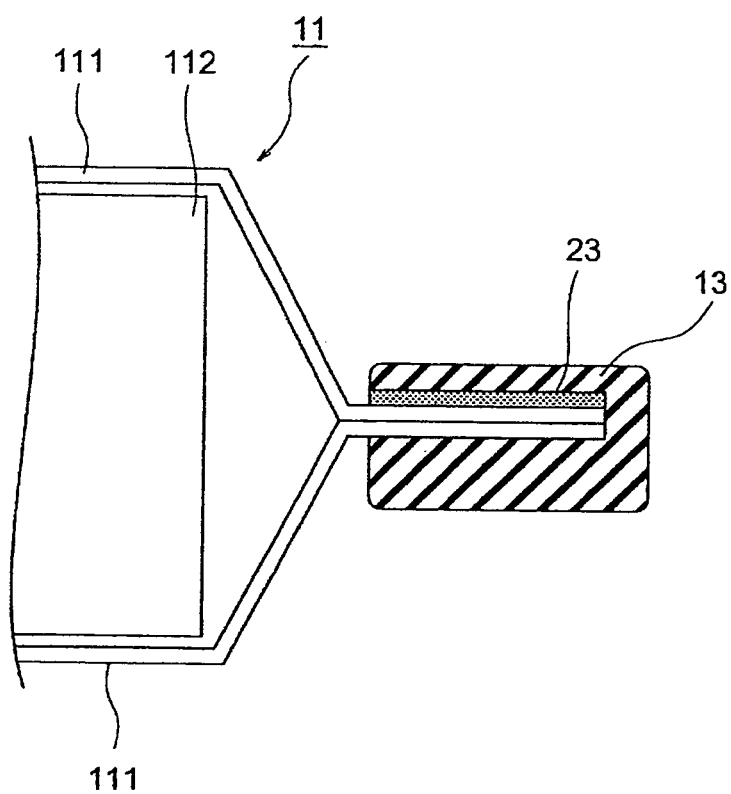
FIG. 21 is a sectional view taken along line XX-XX shown in FIG. 20.

Further, as shown in FIG. 20 and FIG. 21, adhesion strength reduction portion 23 may be disposed so as to extend from one end of the interface which is located on an outer side of the upper exterior package member 111 up to the other end of the interface which is located on an inner side of the upper exterior package member 111. FIG. 20 is an enlarged view of secondary battery 1 according to a modified embodiment of the present invention, showing a part thereof which corresponds to a portion surrounded by line XI shown in FIG. 11. FIG. 21 is a sectional view taken along line XX-XX shown in FIG. 20.

Furthermore, in FIG. 19 and FIG. 21, adhesion strength reduction portion 23 is illustrated as a thickened portion. However, actually, a thickness of adhesion strength reduction portion 23 is substantially zero, and therefore, elastic resin portion 13 and the upper side exterior package member 111 are flush with each other.

The invention claimed is:

1. A stationary electric power system comprising:
a low profile secondary battery electrically connected to an external electric power load;
at least one control unit of a charge control unit that charges the low profile secondary battery with an electric power of an external electric power generating element or a commercial power supply, and a discharge control unit that discharges the electric power of the low profile secondary battery to the electric power load,
the low profile secondary battery comprising:
a battery body comprising an electric power generating element sealed in an exterior package member that is formed of a pair of films sealed together at outer peripheral portions thereof, such that the exterior package member has a sealed outer peripheral portion that is defined as an outer peripheral portion of the battery body;
a spacer that is arranged at the outer peripheral portion of the battery body, and disposed between the battery body and another battery body when the another battery body is stacked on the battery body; and
an elastic body that is a single structure respectively connected to the battery body and the spacer thereby to connect the outer peripheral portion of the battery body and the spacer,
wherein the spacer is formed, at a portion to be connected to the elastic body, with a reinforcing portion having a surface that is perpendicular to an external force direction, the external force direction being a direction of an external force applied parallel to a largest face of said battery body,
wherein the reinforcing portion is disposed at a site of a connection between the spacer and the elastic body,
wherein the exterior package member is formed of a laminated film containing a resin layer, and the elastic body has a hardness smaller than a hardness of the resin layer.

2. The stationary electric power system as claimed in claim 1, wherein the reinforcing portion is at least one of a through hole, a recessed portion, and a rib.

3. The stationary electric power system as claimed in claim 1, wherein an other elastic body is formed on the outer peripheral portion of the battery body in a region except for a region in which the elastic body is formed, such that an end surface of the outer peripheral portion of the battery body is sealed with the other elastic body.

4. The stationary electric power system as claimed in claim 3, wherein the other elastic body has a hardness smaller than a hardness of the resin layer.

5. The stationary electric power system as claimed in claim 3, wherein a fragile portion is formed in the elastic body or the other elastic body.

6. The stationary electric power system as claimed in claim 5, wherein the fragile portion is formed by a cutout portion that is formed by cutting out the elastic body or the other elastic body.

7. The stationary electric power system as claimed in claim 5, wherein the fragile portion is disposed on at least a part of an interface between the elastic body or the other elastic body and the outer peripheral portion of the exterior package member, and an adhesion strength of the fragile portion is lower than an adhesion strength of a part of the interface in which the fragile portion is not disposed.

8. The stationary electric power system as claimed in claim 7, wherein the fragile portion is disposed on a part of the interface which extends from one end of the interface which is located on an outer side of the outer peripheral portion of the exterior package member to a position on the route to the other end of the interface which is located on an inner side of the outer peripheral portion of the exterior package member.

9. The stationary electric power system as claimed in claim 7, wherein the fragile portion is disposed so as to extend from one end of the interface which is located on an outer side of the outer peripheral portion of the exterior package member up to the other end of the interface which is located on an inner side of the outer peripheral portion of the exterior package member.

10. The stationary electric power system as claimed in claim 5, wherein the elastic body or the other elastic body is formed on the outer peripheral portion of the exterior package member, and the fragile portion is formed in the elastic body or the other elastic body which is located on an inner side of the outer peripheral portion of the exterior package member.

11. The stationary electric power system as claimed in claim 5, wherein the elastic body or the other elastic body is formed on the outer peripheral portion of the exterior package member by insert molding of an elastic resin, and the fragile portion is formed in a position on a downstream side of the elastic resin on the outer peripheral portion of the exterior package member with respect to an injection port of the elastic resin.

12. The stationary electric power system as claimed in claim 5, further comprising a terminal derived from a part of the outer peripheral portion of the exterior package member to an outside,
wherein the elastic body or the other elastic body is formed on the outer peripheral portion of the exterior package member, and the fragile portion is formed on the outer peripheral portion of the exterior package member except for the part of the outer peripheral portion of the exterior package member.

13. The stationary electric power system as claimed in claim 5, wherein the elastic body or the other elastic body is formed on the outer peripheral portion of the exterior package member, the fragile portion is disposed on at least a part of an interface between the elastic body or the other elastic body and the outer peripheral portion of the exterior package member, and an adhesion strength of the fragile portion is smaller than a strength of a base material of the elastic body or the other elastic body.

14. The stationary electric power system as claimed in claim 1, wherein an elongated side length of the spacer is not less than a length of the outer peripheral portion of the battery body in which the spacer is arranged.

15. The stationary electric power system as claimed in claim 1, wherein a strength of the spacer is larger than a strength of an electrode plate of the electric power generating element.

16. The stationary electric power system as claimed in claim 1,
wherein the spacer comprises a fixing portion that fixes the battery body in a predetermined position.

17. The stationary electric power system as claimed in claim 16, wherein an elastic resin portion is formed in a region that includes an overlap portion of the battery body and the spacer, by insert molding of an elastic resin.

18. The stationary electric power system as claimed in claim 16, wherein the fixing portion is disposed on both ends of the battery body.

19. The stationary electric power system as claimed in claim 1, wherein the battery body is arranged horizontally or perpendicularly with respect to an installation surface.

20. The stationary electric power system as claimed in claim 1, wherein the stationary electric power system is portable.

21. The stationary electric power system as claimed in claim 1, wherein the elastic body is provided to absorb the external force.

22. The stationary electric power system as claimed in claim 1, wherein the reinforcing portion is provided such that input of the external force into the outer peripheral portion of the battery body is suppressed.

23. The stationary electric power system as claimed in claim 1, wherein the elastic body is arranged to absorb the external force.

24. A method for manufacturing a stationary electric power system, the method comprising:
a step of producing a low profile secondary battery;
a step of connecting the low profile secondary battery to an external electric power load; and
a step of producing at least one of a charge control unit that charges the low profile secondary battery with an electric power of an external electric power generating element or a commercial power supply and a discharge control unit that discharges an electric power of the low profile secondary battery to the electric power load;
the method further comprising:
a step of sealing an electric power generating element in an exterior package member formed of a laminated film that contains a resin layer, thereby obtaining a battery body, the exterior package member being formed of a pair of films sealed together at outer peripheral portions thereof, such that the exterior package member has a sealed outer peripheral portion that is defined as an outer peripheral portion of the battery body;
a step of preparing a spacer with a fixing portion by which the battery body is fixed to a predetermined position;
a step of setting the spacer in an insert molding die in such a manner that the spacer is stacked with the outer peripheral portion of the battery body; and
a step of carrying out an inserting molding by filling a material of elastic resin into a range that is provided at least around the fixing portion at the outer peripheral portion of the battery, body and includes a mutually overlapped portion between the outer peripheral portion of the battery body and the spacer thereby to form in the range an elastic resin portion connecting the outer peripheral portion of the battery body and the spacer,
wherein the spacer is formed, at a portion to be connected to the elastic resin portion, with a reinforcing portion having a surface that is perpendicular to an external force direction, the external force direction being a direction of an external force applied parallel to a largest face of said battery body,
wherein the elastic resin portion has a hardness smaller than a hardness of the resin layer of the laminated film.

25. A method for manufacturing a stationary electric power system, the method comprising:
a step of producing a low profile secondary battery;
a step of connecting the low profile secondary battery to an external electric power load; and
a step of producing at least one of a charge control unit that charges the low profile secondary battery with an electric power of an external electric power generating element or a commercial power supply and a discharge control unit that discharges an electric power of the low profile secondary battery to the electric power load;
the method further comprising:
a step of accommodating an electric power generating element in an exterior package member formed of a laminated film that contains a resin layer, sealing an outer peripheral portion of the exterior package member, thereby obtaining a battery body, the exterior package member being formed of a pair of films sealed together at the outer peripheral portions thereof, such that the exterior package member has a sealed outer peripheral portion that is defined as an outer peripheral portion of the battery body;
a step of preparing a spacer with a fixing portion by which the battery body is fixed to a predetermined position;
a step of setting the spacer in an insert molding die in such a state that the spacer is stacked with the outer peripheral portion of the battery body; and
a step of carrying out insert molding by filling a material of elastic resin into a range that is provided at least around the fixing portion at the outer peripheral portion of the battery body and includes a mutually overlapped portion between the outer peripheral portion of the battery body and the spacer thereby to form in the range an elastic resin portion connecting the outer peripheral portion of the battery body and the spacer,
wherein the spacer is formed, at a portion to be connected to the elastic resin portion, with a reinforcing portion having a surface that is perpendicular to an external force direction, the external force direction being a direction of an external force applied parallel to a largest face of said battery body,
wherein the elastic resin portion has a hardness smaller than a hardness of the resin layer of the laminated film.

* * * * *